(12) United States Patent
Manoj Gangadhar et al.

(10) Patent No.: US 11,144,684 B2
(45) Date of Patent: Oct. 12, 2021

(54) METHOD AND SYSTEM FOR IMPROVING EFFICACY OF MODEL VERIFICATION BY MODEL PARTITIONING

(71) Applicant: The MathWorks, Inc., Natick, MA (US)

(72) Inventors: Dixit Manoj Gangadhar, Bangalore (IN); Prahladavaradan Sampath, Bangalore (IN); Janaki Sivaramakrishnan, Bangalore (IN); William J. Aldrich, Sudbury, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 661 days.

(21) Appl. No.: 15/499,351

(22) Filed: Apr. 27, 2017

(65) Prior Publication Data
US 2017/0351791 A1    Dec. 7, 2017

(30) Foreign Application Priority Data

Jun. 2, 2016  (IN) .............................. 201641019006

(51) Int. Cl.
*G06F 30/20* (2020.01)
*G06F 30/18* (2020.01)

(52) U.S. Cl.
CPC .............. *G06F 30/20* (2020.01); *G06F 30/18* (2020.01)

(58) Field of Classification Search
CPC ....... G06F 17/5009; G06F 30/20; G06F 30/18
See application file for complete search history.

(56) References Cited

U.S. PATENT DOCUMENTS

| 10,387,585 | B2 * | 8/2019 | Manoj Gangadhar ...................... G06F 11/263 |
| 2011/0295578 | A1 * | 12/2011 | Aldrich ..................... G06F 8/10 703/6 |
| 2012/0096430 | A1 | 4/2012 | Lin et al. |

OTHER PUBLICATIONS

Simulink Verification and Validation User's Guide (Year: 2010).*
Simulink Design Verifier User's Guide (Year: 2010).*
Wikipedia, "Modified condition/decision coverage", https://en.wikipedia.org/wiki/Modified_condition/decision_coverage, Feb. 17, 2017, 3 pages.

(Continued)

*Primary Examiner* — Chuen-Meei Gan
(74) *Attorney, Agent, or Firm* — Cesari and McKenna, LLP; Michael R. Reinemann

(57) ABSTRACT

A device may analyze, by one or more processors, a model to identify a first set of model elements that are associated with a model element. The device may apply, by the one or more processors, one or more results from an analysis of the model to a first network unit to determine a complexity of the first network unit or a coupling of the first network unit to other model elements of the model. The device may generate, by the one or more processors, a second network unit, representing a second hierarchy of computation, from the first network unit based on the complexity or the coupling. The device may provide, by the one or more processors, the second network unit as a testing unit for testing the model, the second network unit comprising two or more model elements and one or more numeric expressions.

44 Claims, 17 Drawing Sheets

(56) References Cited

OTHER PUBLICATIONS

Whalen et al., "Observable Modified Condition/Decesion Coverage", https://www.umsec.umn.edu/sites/www.umsec.umn.edu/files/whalen-icse13.pdf, 2013, 10 pages.
"Simulink® 7: User's Guide," The MathWorks, Inc., Mar. 2010, pp. 1-1616.

* cited by examiner

METHOD AND SYSTEM FOR IMPROVING EFFICACY OF MODEL VERIFICATION BY MODEL PARTITIONING

CROSS-REFERENCE TO RELATED APPLICATION UNDER 35 U.S.C. § 119

This application claims priority to Indian Patent Application No. 201641019006, filed Jun. 2, 2016, entitled "METHOD AND SYSTEM FOR IMPROVING EFFICACY OF MODEL VERIFICATION BY MODEL PARTITIONING," which is hereby expressly incorporated by reference herein.

SUMMARY

According to some possible implementations, a method may comprise, for a model comprising model elements, where at least some of the model elements comprise one or more numeric expressions, and represent one or more computations, analyzing, by one or more processors, the model to identify a first set of model elements that are associated with a model element. The analyzing may comprise analyzing a relationship between one or more computations represented by the first set of model elements and one or more computations represented by the model element. The first set of model elements and the model element may form a first network unit that represents a first hierarchy of computation. The method may comprise applying, by the one or more processors, one or more results from an analysis of the model to the first network unit to determine a complexity of the first network unit or a coupling of the first network unit to other model elements of the model.

The method may comprise generating, by the one or more processors, a second network unit, representing a second hierarchy of computation, from the first network unit based on the complexity or the coupling. The generating may comprise generating the second network unit by adding one or more additional model elements of the model into the first network unit, or removing one or more model elements of the first network unit from the first network unit. The method may comprise providing, by the one or more processors, the second network unit as a testing unit for testing the model, the second network unit comprising two or more model elements and one or more numeric expressions.

In some implementations, the second network unit may comprise one or more Boolean expressions, one or more control expressions, or one or more saturations. The one or more numeric expressions may comprise variables and expressions that correspond to values comprising floating data type in compliance with Institute of Electrical and Electronics Engineers (IEEE) standard 754, fixed point data type, or integer data type, may comprise one or more callouts to functions, or may comprise a numeric runtime library.

In some implementations, the method may further comprise performing the analysis. In some implementations, the one or more results from the analysis may comprise a result of a model element type analysis, a result of a model element connectivity analysis, or a result of a model element static dependency analysis. Additionally, or alternatively, the one or more results from the analysis may identify model elements that are active in a time window during a dynamic simulation of the model.

In some implementations, the second network unit may be for use as a single unit for testing the model. In some implementations, the method may further comprise forming other network units as testing units. The other network units may have different sizes from the second network unit and may represent different hierarchies of computation from the second hierarchy of computation.

In some implementations, analyzing the relationship may comprise analyzing based on one or more rules that are customizable by a user. In some implementations, the one or more rules may comprise a text-based rule or a rule generated from a graphical affordance. In some implementations, the method may further comprise providing an application programming interface for customizing the one or more rules. In some implementations, the model may comprise a textual model, a graphical model, or a model that comprises a textual component and a graphical component.

In some implementations, the method may further comprise generating one or more metrics for testing the second network unit. In some implementations, generating the one or more metrics may comprise analyzing one or more element metrics of individual model elements of the second network unit and generating the one or more metrics based on one or more rules and the one or more element metrics. Additionally, or alternatively, the method may further comprise generating one or more tests based on the one or more metrics. In some implementations, the one or more rules may be customizable by a user.

In some implementations, generating the one or more metrics may comprise receiving an input from the user and applying an algorithm to generate test generation objectives based on the input. Additionally, or alternatively, generating the one or more metrics may comprise applying the algorithm to generate instructions for measuring satisfaction of the one or more metrics or to annotate the test generation objectives.

In some implementations, the method may further comprise displaying the second network unit and at least some of the other model elements of the model on a user interface and displaying a chain of model elements in the second network unit, that is a test generation objective of one of the one or more metrics, differently from other model elements displayed on the user interface. Additionally, or alternatively, the method may further comprise displaying the second network unit and at least some of the other model elements of the model on a user interface and displaying the one or more results of the analysis on the user interface. In some implementations, displaying the one or more results of the analysis on the user interface may comprise displaying one or more model elements that are related to the one or more results differently from other model elements displayed on the user interface.

In some implementations, the one or more results of the analysis may comprise results of a dead logic analysis. In some implementations, the one or more model elements that are related to the one or more results may comprise one or more model elements in the second network unit that are not executed.

According to some possible implementations, a method may comprise, in a modeling environment in which models are generated in a modeling language, receiving an indication that a first composite of model elements, supported by the modeling environment, is selected as a candidate for a rule in partitioning a model that comprises the first composite of model elements. At least some model elements of the first composite of model elements may be connected. At least some of the model elements of the first composite of model elements may comprise one or more numeric expressions and represent one or more computations. The first composite of model elements may be usable as a unit in generating the models or may be part of the model in the modeling environment. The first composite of model elements may be in the same modeling language as the models generated in the modeling environment.

The method may comprise analyzing, by one or more processors, the first composite of model elements to determine whether to accept the first composite of model elements as the rule. The analyzing may comprise analyzing a relationship among computations represented by the model elements of the first composite of model elements. The method may comprise selectively storing, by the one or more processors, the rule in a rule repository based on analyzing the first composite of model elements. The method may comprise selectively providing the rule for use in partitioning the model into testing units for testing the model.

In some implementations, the analyzing may comprise applying a result of analyzing the first composite of model elements. In some implementations, the first composite of model elements may comprise subsystems, operations, expressions, or variants. In some implementations, the method may further comprise identifying a network unit within the model by comparing the model with the first composite of model elements.

In some implementations, the first composite of model elements may be accepted as a recursive rule. The first composite of model elements may be stored in a library. In some implementations, the first composite of model elements may be selected from a library of the modeling environment. Additionally, or alternatively, the first composite of model elements may be selected using an existing model displayed in the modeling environment.

DETAILED DESCRIPTION

The following detailed description of example implementations refers to the accompanying drawings.

A user may use a device to verify a model (e.g., a mathematical, an executable model, and/or programmatic model that simulates a dynamic system (either natural or man-made). When verifying the model, the user may wish to improve an efficacy of verification of the model by implementing a technique for improving the efficacy of the verification. For example, the user may implement modified condition/decision coverage (MC/DC) to generalize expressions associated with a model. In some cases, the technique may be limited by, for example, applying only to Boolean expressions contained in the model, as is the case with MC/DC.

Implementations described herein partition a model into network units that include model elements. At least some network units contain numeric computations and/or expressions, in addition to Boolean expressions, for model verification and/or testing. This improves an efficacy of verification of the model by isolating particular portions of the model via partitioning of the model into network units. For example, partitioning of the model enables coordination of operations associated with multiple model elements, such as to reduce or eliminate masking of operations while maintaining a performance of executing the model. In some implementations, the device may apply one or more rules, such as customized rules or default rules, to manage the partitioning of the model, thereby improving the efficacy of the model by controlling a manner in which the model is partitioned.

In some implementations, a device may generate tests using the network units. For example, the device may analyze the network units to generate network metrics and may generate tests for the model based on the network metrics. In some implementations, generation of the network metrics may be customizable by a user and/or based on user input. This improves an efficacy of model testing by using network units that coordinate the operations of multiple model elements to generate tests for the model.

In some implementations, the device may provide the model for display. For example, the device may provide model elements and network units for display via a user interface of the device. In some implementations, the device may permit the user to interact with the model to view information associated with the model elements and/or the network unit. This improves model testing by, for example, enabling the user to visualize information associated with testing the model.

Figure 1A:
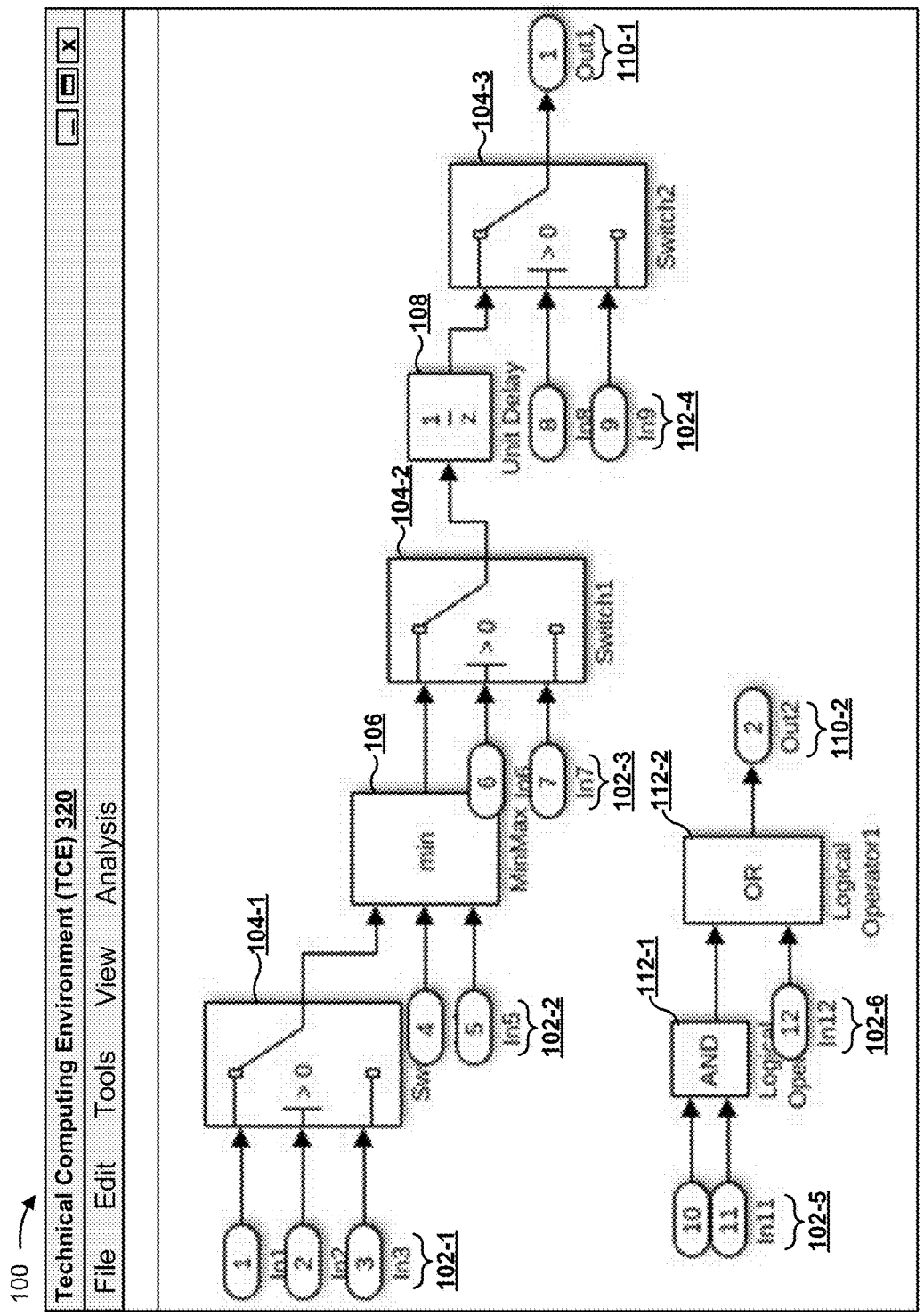
FIGS. 1A-1G are diagrams of an overview of an example implementation described herein.
Figure 1B:
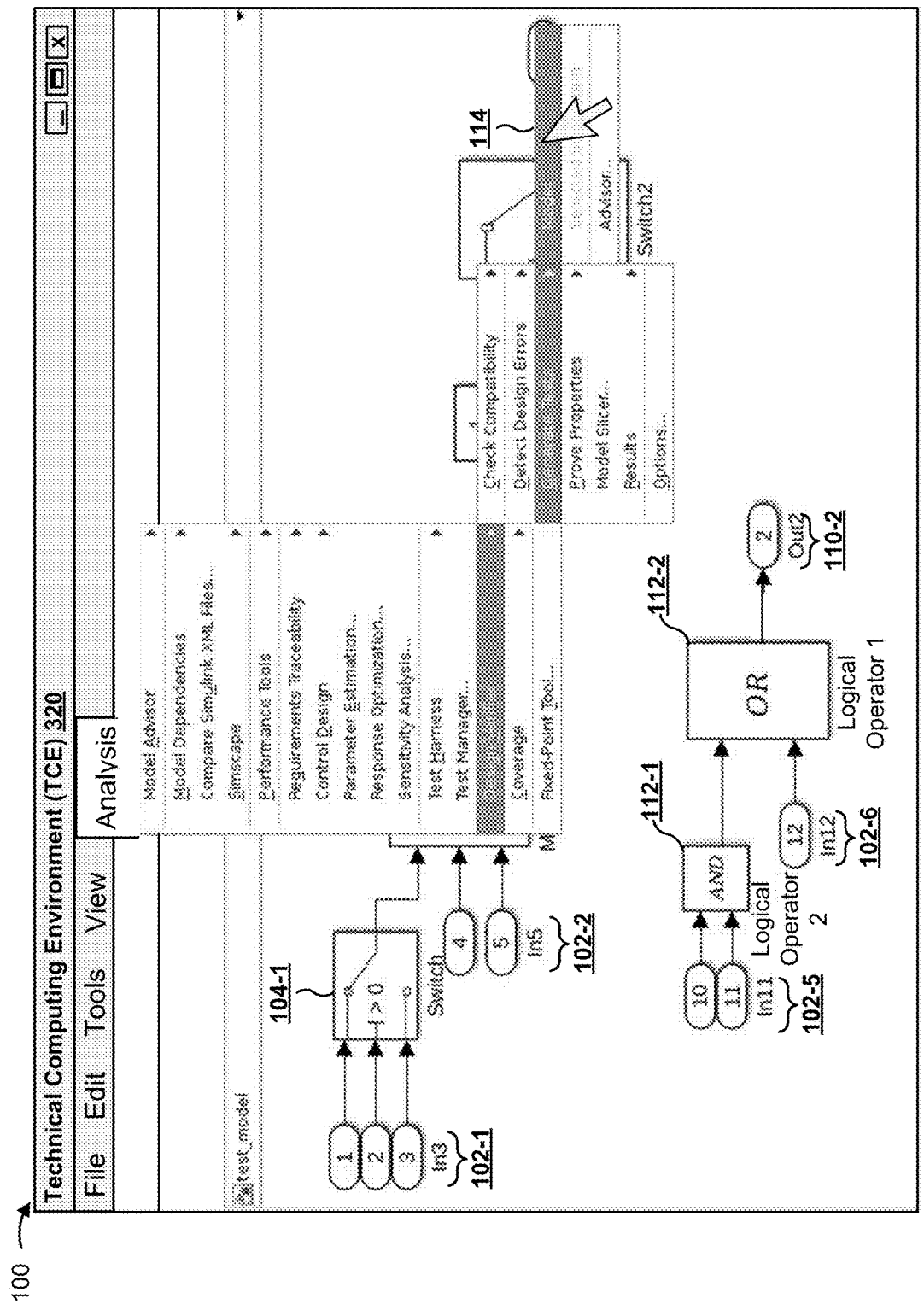

FIGS. 1A-1G are diagrams of an overview of an example implementation 100 described herein. As shown in FIG. 1A, a technical computing environment (TCE) 320 may display a model. For example, TCE 320 may display a model created by a user of a device. In some implementations, the model may include one or more model elements (e.g., computation elements, logical operator elements, or expression elements), which may be represented using blocks (e.g., in a block diagram model). For example, the model elements may include a decision element (e.g., a switch element), a min/max element, a memory element, an arithmetic expression or computation, or a Boolean expression.

As shown in FIG. 1A, the model may include one or more inport element sets 102-1 through 102-6 associated with model elements of the model. The one or more inport element sets 102 may include one or more inport elements, such as inport elements 1 through 12. The inport elements may be associated with receiving external input to the model. For example, the model elements may receive input from another model, from the user, from external hardware, etc. via the inport elements.

The model may further include switch elements 104-1 through 104-3. The switch elements 104-1 through 104-3 may receive input from one or more inport elements and may switch output between inputs received from the inport elements. For example, switch elements 104-1 through 104-3 may switch output between first input received from a first inport element and second input received from a second inport element based on a value of third input received from a third inport element. The model may further include a min/max element 106 associated with outputting a minimum or a maximum input of multiple inputs. For example, min/max element 106 may receive output of switch element 104-1 and input via inport elements 4 and 5 as input, and may output the minimum value of the inputs received. The model may further include unit delay element 108 associated with delaying output by a particular period of time after receiving input.

The model may further include outport elements 110-1 and 110-2. In some implementations, outport elements 110-1 and 110-2 may include output ports associated with providing output to a destination external to the model (e.g., to another model, to external hardware, or for display to the user). The model may further include logical operator elements 112-1 and 112-2 associated with performing a logical operation on input (e.g., an "and" operation or an "or" operation). In some implementations, the model may include different and/or differently arranged model elements, such as a memory element, or the like.

The model of FIG. 1A can be verified. In the example shown in FIG. 1B, and by reference number 114, the device may provide a "Model" menu item associated with an "Analysis" menu. In some implementations, selection of the "Model" menu item may cause the device to generate a test (e.g., a verification test) for the model. Additionally, or alternatively, the user may interact with a button or another input mechanism associated with TCE 320 to generate the test for the model (e.g., rather than selecting a menu item from a menu to generate the test for the model). For example, TCE 320 may display a "Generate Test" button, selection of which may generate the test for the model.

Figure 1C:
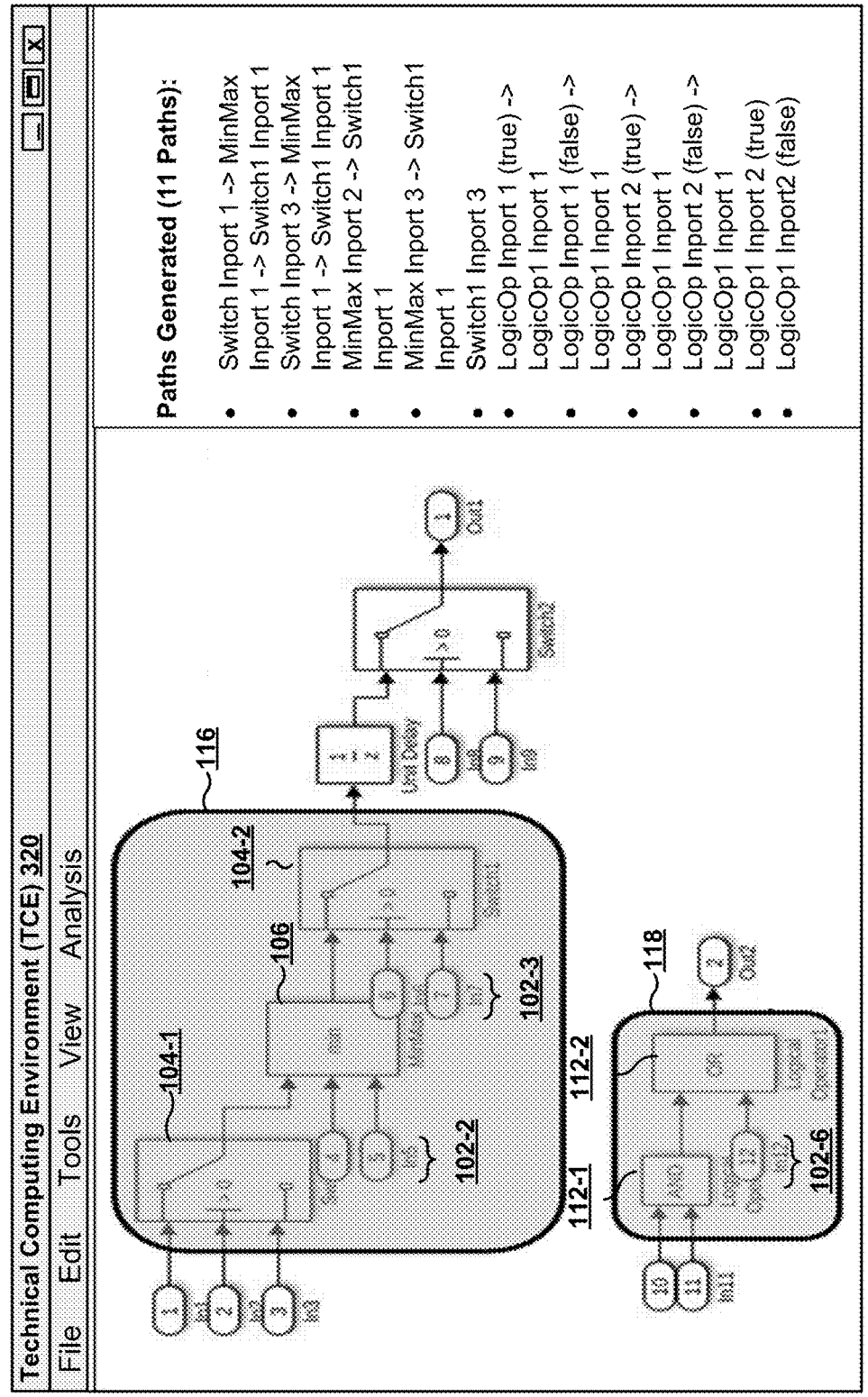

As shown in FIG. 1C, the device may partition the model by grouping the model elements into one or more network units (e.g., based on a result of an analysis, as described elsewhere herein). In some implementations, a network unit may include a set of related model elements grouped together for testing purposes. For example, the device may create partitioned network unit 116, which can include switch elements 104-1 and 104-2, min/max element 106, and inport elements 4 through 7. As another example, the device may create partitioned network unit 118, which can include inport element 12 and logical operator elements 112-1 and 112-2. When verifying the model, the device may treat each of network units 116 and 118 as a single, non-splittable, unit for testing by generating tests for the network unit (e.g., rather than treating the model elements of network units 116 and 118 as individual model elements for testing by generating tests for each of the individual model elements).

As an example, a network unit may include a collection of blocks and/or signals that form a connected component (e.g., in a syntactic graph or derived from a syntactic graph). In some implementations, creation of a network unit may include processing steps, such as bus expansion, signal propagation, creation and/or insertion of synthesized blocks and/or signals, or the like. A network unit may have a well-defined interface that includes one or more input signals and one or more output signals. Additionally, or alternatively, a network unit may define a function or relation used to obtain the output signal(s) from the input signal(s). Such function or relation may include states, may be expressed explicitly by a closed-form expression or a parametric-form expression, or may be expressed implicitly by a set of algebraic equations. Different network units may be logically distinct from one another, such that a model (e.g., a block diagram) can be constructed or re-constructed using the network units as subsystems, either using the network units alone or in combination with additional blocks that connect the network units.

A network unit may be associated with a measure of size and/or complexity, which may be used to control a process, described herein, of identifying network units from a model (e.g., a block diagram). In some implementations, the size and/or complexity of a network unit may be measured syntactically, such as based on the number of blocks included in the network unit, the number of signals included in the network unit, a number of coverage objectives associated with (e.g., received by) blocks and/or signals included in the network unit, a vertex degree of a graph of the network unit (e.g., a syntactic graph), a diameter of the graph, or the like. Additionally, or alternatively, the size and/or complexity of a network unit may be measured semantically, such as based on an amount of memory required to evaluate the function and/or relation defined by the network unit, a maximum and/or minimum number of primitive operations performed by the function and/or relation, a dimension and/or order of the function and/or relation, or another type of numerical or analytic measure associated with semantics of the function and/or relation.

Using a network unit for testing improves an efficacy of verifying the model by, for example, enabling the device to receive more information, associated with verifying the model, from a network unit than from a model element. In addition, this improves an efficacy of verifying the model by, for example, generating tests that reduce or eliminate instances of masking of operations of the model elements. For example, partitioning the model into network unit 116 enables the coordination of the operations of switch element 104-1, min/max element 106 and switch element 104-2, thereby preventing masking of switch element 104-1, as would be the case if switch element 104-1 was prevented from affecting the output of switch element 104-2. A similar example may be applied to network unit 118.

In some implementations, the partitioning may be based on analyzing dependencies of model elements. In some implementations, the device may identify model elements that are dependent on other model elements, such as model elements that receive output from another model element as input. In some implementations, the device may group model elements that are dependent. For example, the device may permit grouping of a first model element and a second model element into a network unit when the output of the first model element is provided to the second model element and when the first model element and the second model element include a decision element (e.g., a logical operator element or a true/false determination element).

Conversely, for example, the systems/methods of the disclosure may identify model elements that are not dependent on any other model elements, such as model elements that do not receive an input that is output from another model element. In the example shown in FIG. 1C, switch element 104-1 as a model element does not depend on another model element because switch element 104-1 does not receive input that is output from another model element. As another example, logical operator element 112-1 as a model element does not depend on another model element.

In some implementation, the device may determine whether to group model elements. For example, the device may determine whether to group other model elements with the identified non-dependent model elements (e.g., switch element 104-1 and logical operator element 112-1). In some implementations, the device may identify model elements to group with the non-dependent model elements based on a connectivity of the model elements to the non-dependent model elements. For example, the device may group a model element and a non-dependent model element based on the model element and the non-dependent model element being connected.

In some implementations, the device may use a rule associated with the connectivity of the model elements to determine whether to group the model elements. For example, the rule may prevent grouping of a first model element and a second model element when the output of the first model element is provided to a control inport of the second model element. In some implementations, the control inport may include an inport of a switch element associated with a threshold parameter used to control which input of the switch element is provided as output by the switch element.

As another example, if a model element is assigned a decision metric and the input of the model element is connected, via intermediate model elements (e.g., feed-through model elements), to another model element that includes a condition metric, a rule may permit the device to group the model element, the other model element, and the intermediate model elements into a network element. In some implementations, the device may combine network units when the device determines to combine model elements from multiple network units. For example, the device may combine two network units into a single network unit when the rule indicates combining a first model element associated with a first network unit and a second model element associated with a second network unit.

In some implementations, the device may modify the network unit. For example, the device may add model elements to the network unit, remove model elements from the network unit, combine two or more network units into a single network unit, or split a network unit into two or more network units after partitioning the model.

In some implementations, the device may modify the network unit using a rule. For example, the rule may permit grouping of a first model element and a second model element when the first model element includes a decision and the input to the second model element is received from the first model element, which also includes a decision element. In some implementations, the device may combine two or more network units. For example, the device may group two network units into a single network unit when a rule indicates to group model elements from each of the network units (e.g., when a first model element, of a first network unit, is connected to a second model element of a second network unit). In some implementations, the rule used to partition the model may be a customized rule. For example, a user may define a rule using text. As another example, the user may define a rule using model elements. In some implementations, the user may define the rule using a user interface of the device. Rule customization may be described in more detail elsewhere herein.

In some implementations, device may identify model elements to group based on performing a dependency analysis of the model elements. In some implementations, the dependency analysis may include identifying rules for grouping model elements based on a type of the model elements (e.g., a switch element type or a min/max element type), a dependency of a model element to other model elements, etc. In some implementations, using the dependency analysis to identify model elements to group into a network unit may include determining a complexity of a network unit resulting from the grouping. For example, the device may determine a quantity of connections among model elements included in the network unit. In some implementations, the device may prevent grouping of model elements or may ungroup model elements based on the complexity of the resulting network unit. For example, the device may prevent grouping of the model elements when the quantity of connections exceeds a threshold quantity of connections.

As another example, the device may determine whether a model element is connected to a model element not included in the model (e.g., a remote model element in an external model, such as a remote bus element, a remote mux element, or a remote memory element). In some implementations, the device may prevent the grouping of model elements when a model element is connected to or dependent on input from a remote model element.

Additionally, or alternatively, the dependency analysis may include identifying rules based on a functioning of the model. For example, the device may identify model elements to group based on which model elements are active in a particular time period during execution of the model (e.g., during model simulation). Continuing with the previous example, the device may separate a first network unit into a second and a third network unit by grouping a first set of model elements of the first network unit that are active, inactive, in a steady state, or in a transient state in a first time period into the second network unit and by grouping a second set of model elements of the first network unit that are active, inactive, in a steady state, or in a transient state in a second time period into the third network unit. This enables generation and analysis of test generation objectives, such as objectives for requirements-based testing, model coverage objectives, model verification objectives, or path objectives, across multiple time periods, thereby improving an efficacy of model verification.

In some implementations, the device may prevent grouping of model elements based on whether or not the model elements are associated with a rule (e.g., a rule used to constrain a manner in which data is passed via the model elements). For example, the device may prevent grouping two model elements unless each model element is associated with a rule.

Verification tests can be generated for each network unit to verify the network unit, and the entire model. The tests can be generated based on test generation objectives. In some implementations, the device may generate a metric, such as a constraint or criteria that relate to generating test generation objectives. In some implementations, the metric may be associated with a network unit (e.g., a network metric). For example, assume that a network unit includes a switch element. In this example, network metrics may include criteria for passing a true value via the switch element and criteria for passing a false value via the switch element. Generating test generation objectives based on criteria included in the network metric can increase model coverage during generation of test generation objectives, for example, by causing the device to generate test generation objectives that cover both true and false values for the switch element (e.g., rather than generating a test generation objective for only true values or only false values).

In some implementations, the network metric may be associated with element metrics of model elements of the network unit. For example, the network metric may represent an aggregation of element metrics. In some implementations, the network metric may be associated with a subset of element metrics of the model elements of the network unit. For example, a first network metric may be associated with element metrics of a switch model element, where the first network metric applies to a true inport of the switch model element and causes a control port of the switch model element to evaluate to true.

As another example, a second network metric may be associated with the element metrics of the switch model element, where the second network metric applies to a false inport of the switch model element and causes a control port of the switch model element to evaluate to false. As another example, multiple network metrics may be associated with element metrics of a multiplication model element, where the multiple network metrics restrict input to the multiplication model element to non-zero numbers. In some implementations, using network metrics may prevent masking by, for example, causing an inport of a switch model element to evaluate to true or preventing a multiplication model element from receiving non-zero numbers, which would cause values to be passed via the switch model element and the multiplication model element.

In some implementations, the device may generate a metric that includes criteria associated with generating a test for the model. For example, the device may generate an execution metric associated with determining whether the network unit was executed during execution of the model to test whether a network unit was executed (e.g., rather than including criteria for generating test generation objectives, as may be the case with a network metric). As another example, the device may generate a condition metric associated with determining whether inputs to a logical operation of a model element of the network unit are true/false values to test whether inputs to a logical operation of a model are true or false values. As another example, the device may generate a decision metric associated with determining whether outputs from a logical operation of a model element of the network unit are true/false values to test whether outputs from a logical operation of a model are true or false values.

As another example, the device may generate a relational metric associated with determining whether limits of relational operations, such as operations that test whether a first value is greater than, less than, greater than or equal to, etc. a second value, are tested. As another example, the device may generate a coverage metric associated with determining coverage of test generation objectives, such as condition coverage, decision coverage, MC/DC coverage, model element execution coverage, or relational boundary coverage. In some implementations, the device may use the metrics when generating tests to verify the model by, for example, generating test generation objectives that test the metrics, thereby ensuring that the model is adequately tested.

In some implementations, TCE 320 may provide information to the device for generating test generation objectives. For example, TCE 320 may provide information indicating the rules and the network metrics to the device as input for an algorithm that generates test generation objectives. Additionally, or alternatively, TCE 320 may provide the device with instructions for determining whether the network metrics are satisfied in association with generating the test generation objectives and/or information indicating one or more test generation objectives. In this way, TCE 320 enables a device to generate test objectives (e.g., automatically without input from the user).

In some implementations, the device may generate a path for data via the network unit based on the model elements of the network unit and the metrics. For example, assume that the device has grouped a first switch element, a min/max element, and a second switch element into a network unit, such as network unit 116 in FIG. 1C. In this case, the device may generate multiple paths from an inport of the first switch element to an inport of the min/max element to an inport of the second switch element.

In some implementations, the device may generate a test generation objective for a path, such as a path objective, of the multiple paths. For example, the device may generate a test generation objective for a path where a control port of switch element 104-1 evaluates to true, an inport of min/max element 106 that receives output from switch element 104-1 is set as the minimum input for min/max element 106, and a control port of switch element 104-2 that receives output from min/max element 106 evaluates to true. This enables the device to generate a test that tests a path, such as a path from switch element 104-1 to min/max element 106 to switch element 104-2.

In some implementations, the device may display information indicating the generated paths (e.g., shown as "Paths Generated (11 Paths)" in FIG. 1C). In some implementations, the device may automatically generate program code to record the creation of network units, the generation of metrics, and/or the identification of the paths.

Figure 1D:
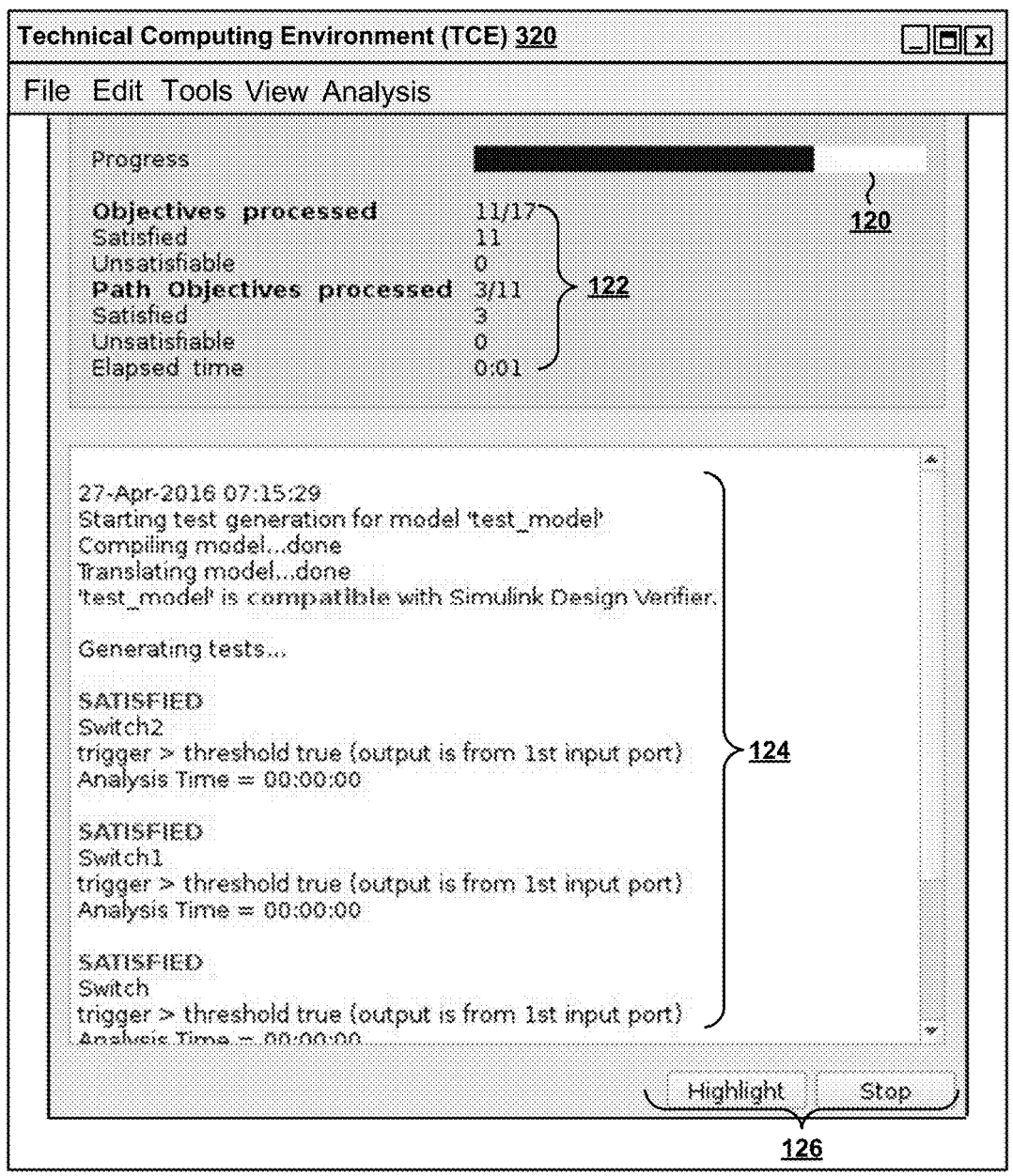

As shown in FIG. 1D, TCE 320 may provide (e.g., display on a user interface), information associated with generating tests for the model. For example, TCE 320 may provide (e.g., display), a progress bar 120 that indicates a progress of generating the one or more test generation objectives for the model. As another example, and as shown by reference number 122, TCE 320 may provide information indicating a quantity of test generation objectives processed, a quantity of the test generation objectives satisfied or unsatisfied, and/or an elapsed time for generating the test generation objectives. Generating test generation objectives based on network units improves model verification and conserve computing resources by generating fewer test generation objectives (e.g., relative to generating test generation objectives based on model elements rather than network units).

As shown by reference number 124, TCE 320 may provide detailed information, for display, associated with generating the tests and/or the test generation objectives for the model. For example, TCE 320 may provide information indicating whether trigger values received by a model element satisfy a threshold value (e.g., shown as "trigger>threshold true," indicating that a trigger value is greater than a threshold value). As another example, TCE 320 may provide information indicating a source of output from a model element (e.g., shown as "output is from 1st input port"). In some implementations, TCE 320 may provide information, similar to that described with respect to the previous examples, for network units (e.g., rather than for model elements). As shown by reference number 126, TCE 320 may provide buttons, such as a "Highlight" button and/or a "Stop" button. In some implementations, user selection of the one or more buttons may cause TCE 320 to perform one or more actions, such as highlighting particular tests or stopping generation of the tests and/or test generation objectives.

Figure 1E:
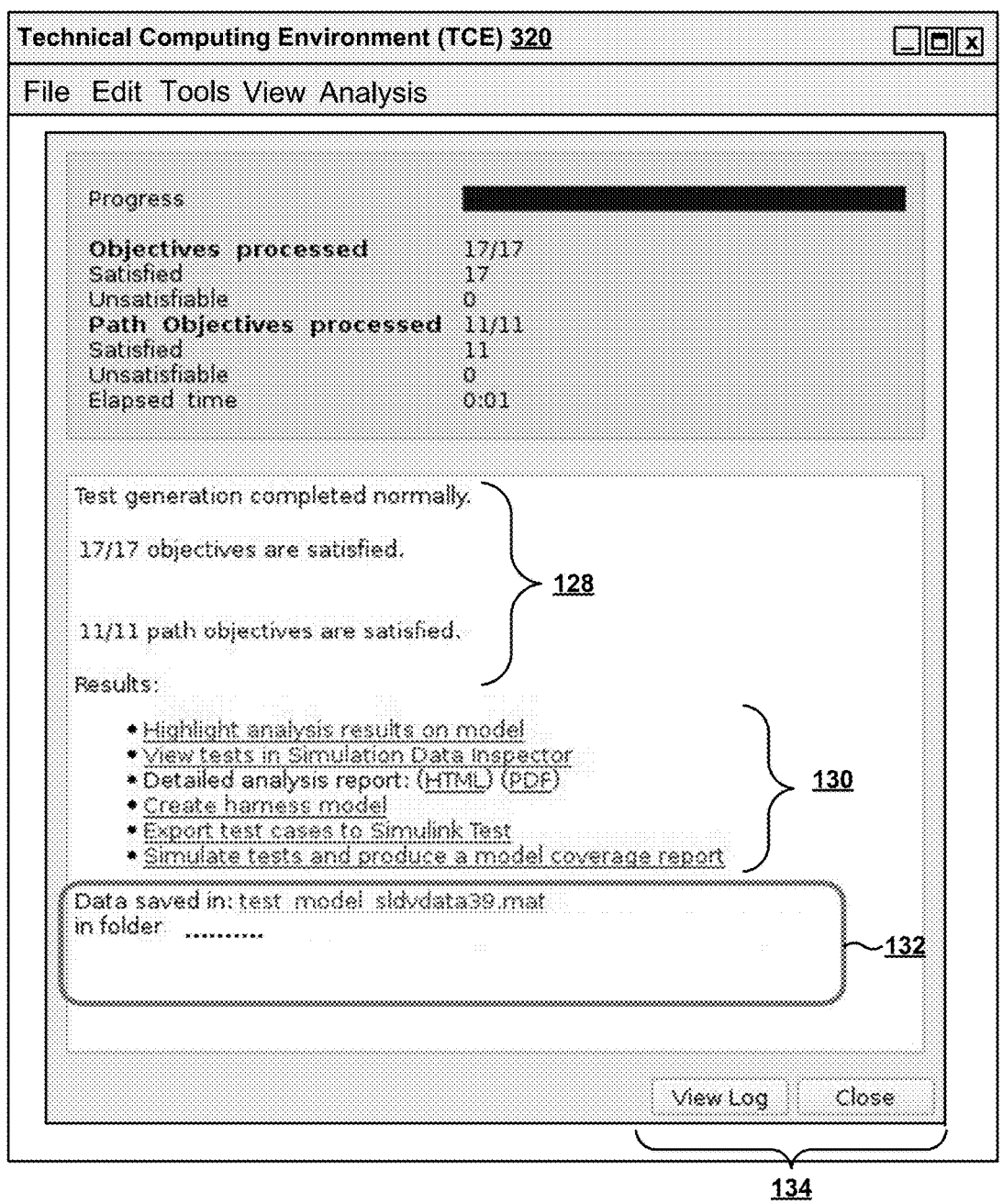

As shown in FIG. 1E, and by reference number 128, TCE 320 may display information that indicates a status of the generation of the test generation objectives, such as test generation objective for network units. As shown by reference number 130, TCE 320 may display links (e.g., a resource identifier, such as a hyperlink, hypertext, or a uniform resource identifier). User interaction with the links may cause TCE 320 to present information to the user or to perform an action, such as highlighting a portion of the model, viewing test generation objectives generated, exporting the test generation objectives, etc.

As shown by reference number 132, TCE 320 may display information indicating a file path or location in memory of data associated with the generation of the test generation objectives, such as test generation objectives for network units. As shown by reference number 134, TCE 320 may provide buttons, such as a "View Log" button and/or a "Close" button. In some implementations, user interaction with the buttons may cause TCE 320 to perform one or more actions, such as displaying an activity log associated with generation of the test generation objectives and/or closing a user interface.

Figure 1F:
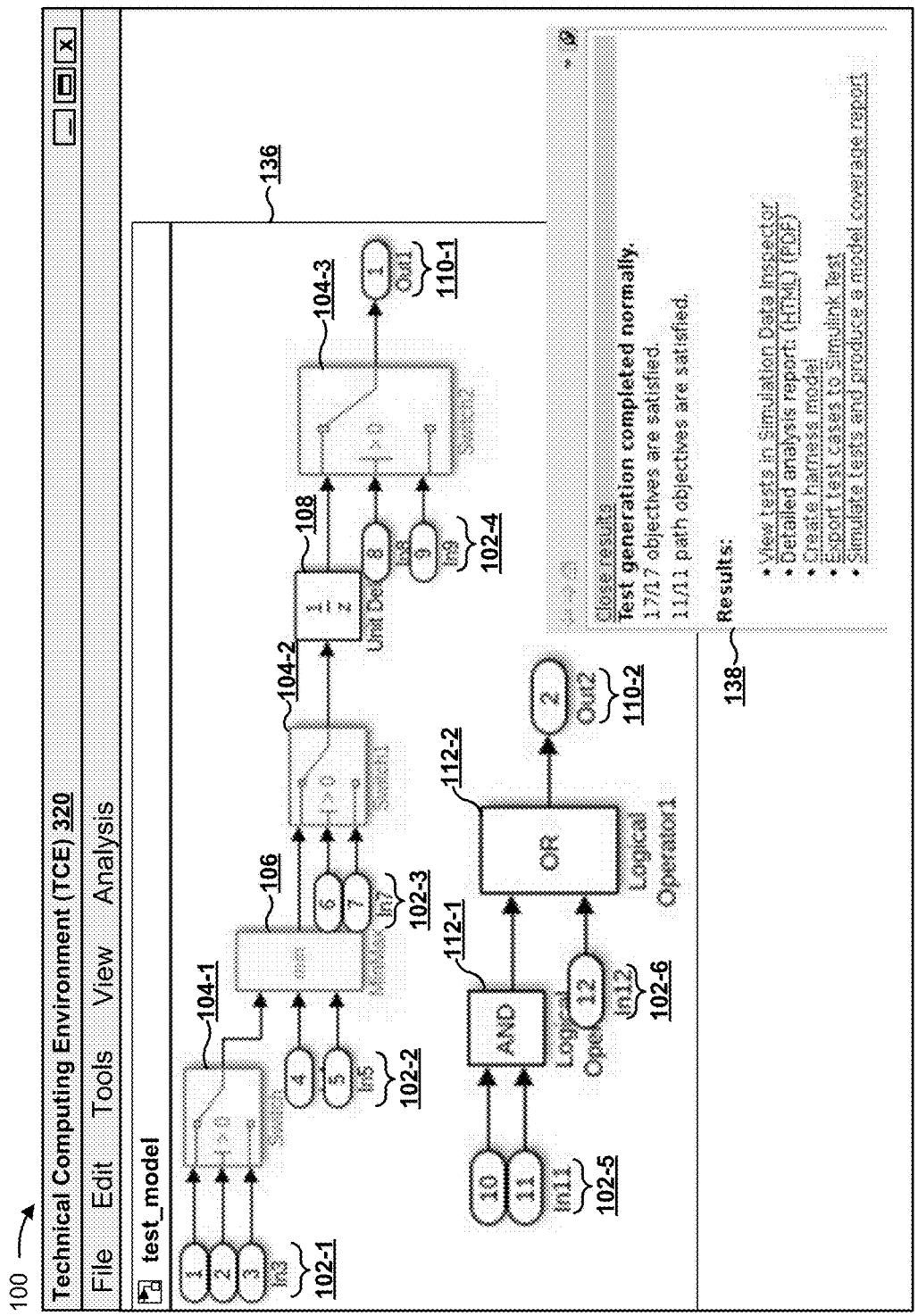

As shown in FIG. 1F, and by reference number 136, TCE 320 may display the model in association with generating the test generation objectives, such as test generation objectives for network units. In some implementations, TCE 320 may permit the user to interact with the model by, for example, permitting the user to click on the displayed model elements. In some implementations, user interaction with the model may cause TCE 320 to perform one or more actions, such as displaying information associated with the model elements (e.g., information indicating metrics of the model element or information indicating dependencies of the model element), as described more fully below.

In some implementations, the device may perform an analysis of the test generation objectives, such as test objectives for network units. For example, the device may perform design-error detection, property proving, test generation, simulation, test execution, or coverage analysis. In some implementations, TCE 320 may display information associated with the analysis of the test generation objectives. For example, TCE 320 may highlight particular paths of the model (e.g., based on whether a test generation objective associated with the path is satisfied, unsatisfiable, etc.). As another example, TCE 320 may highlight a particular network unit, a portion of a network unit associated with a particular network metric or test generation objective, and/or a particular model element. As shown by reference number 138, TCE 320 may display information that indicates a status of the generation of the test generation objectives and/or links.

Figure 1G:
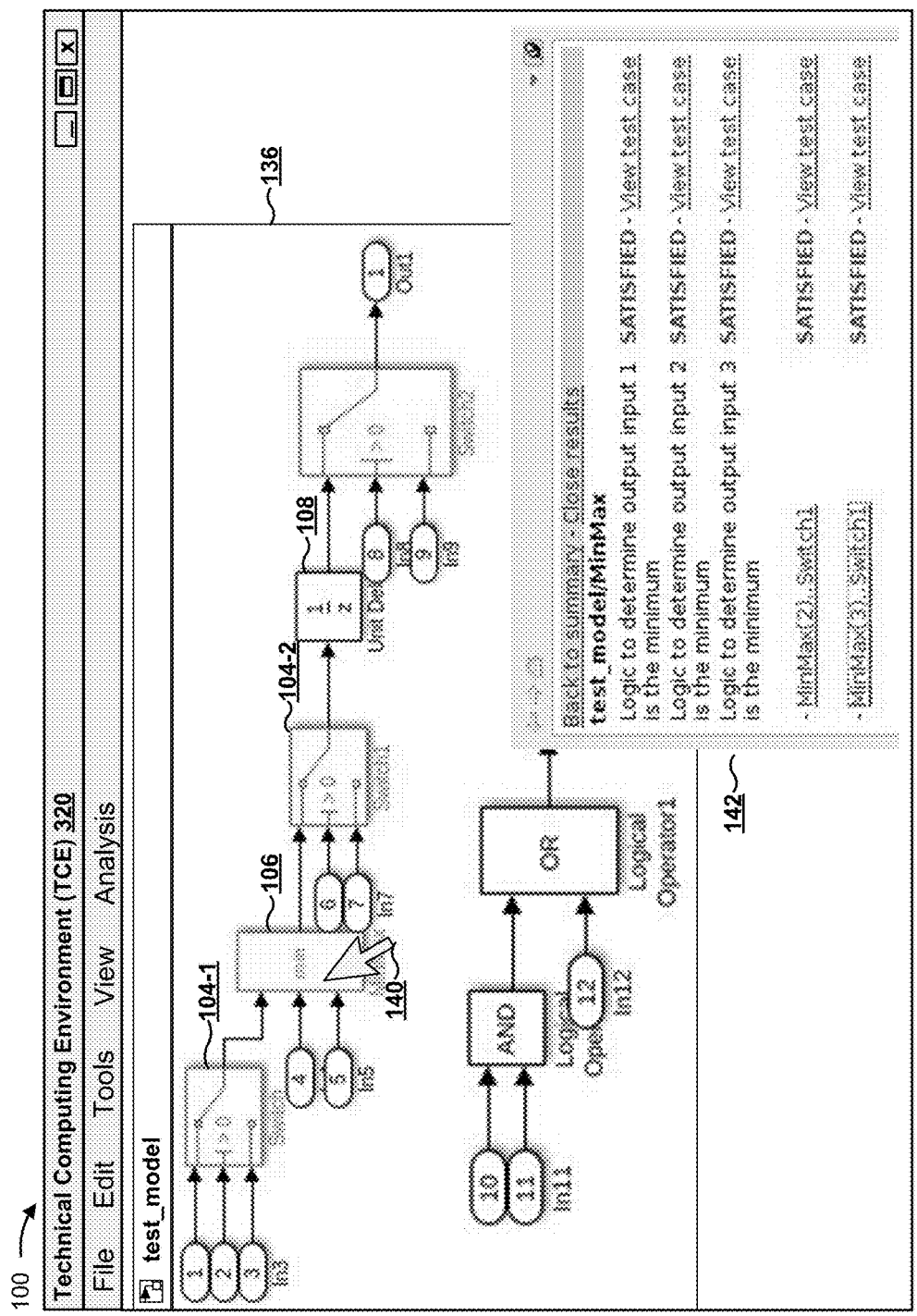

As shown in FIG. 1G, and by reference number 140, the user may interact with the model displayed by TCE 320 (e.g., by interacting with model elements and/or network units of the model). For example, the user may use a cursor to click on min/max element 106. As shown by reference number 142, interaction with min/max element 106 may cause TCE 320 to display information associated with min/max element 106. For example, TCE 320 may display information indicating whether test generation objectives associated with min/max element 106 are satisfied. In some implementations, TCE 320 may display information indicating whether test generation objectives associated with a path, such as path objectives, are satisfied. For example, TCE 320 may display information indicating whether a path from min/max element 106 to switch element 104-2 is satisfied.

Figure 2A:
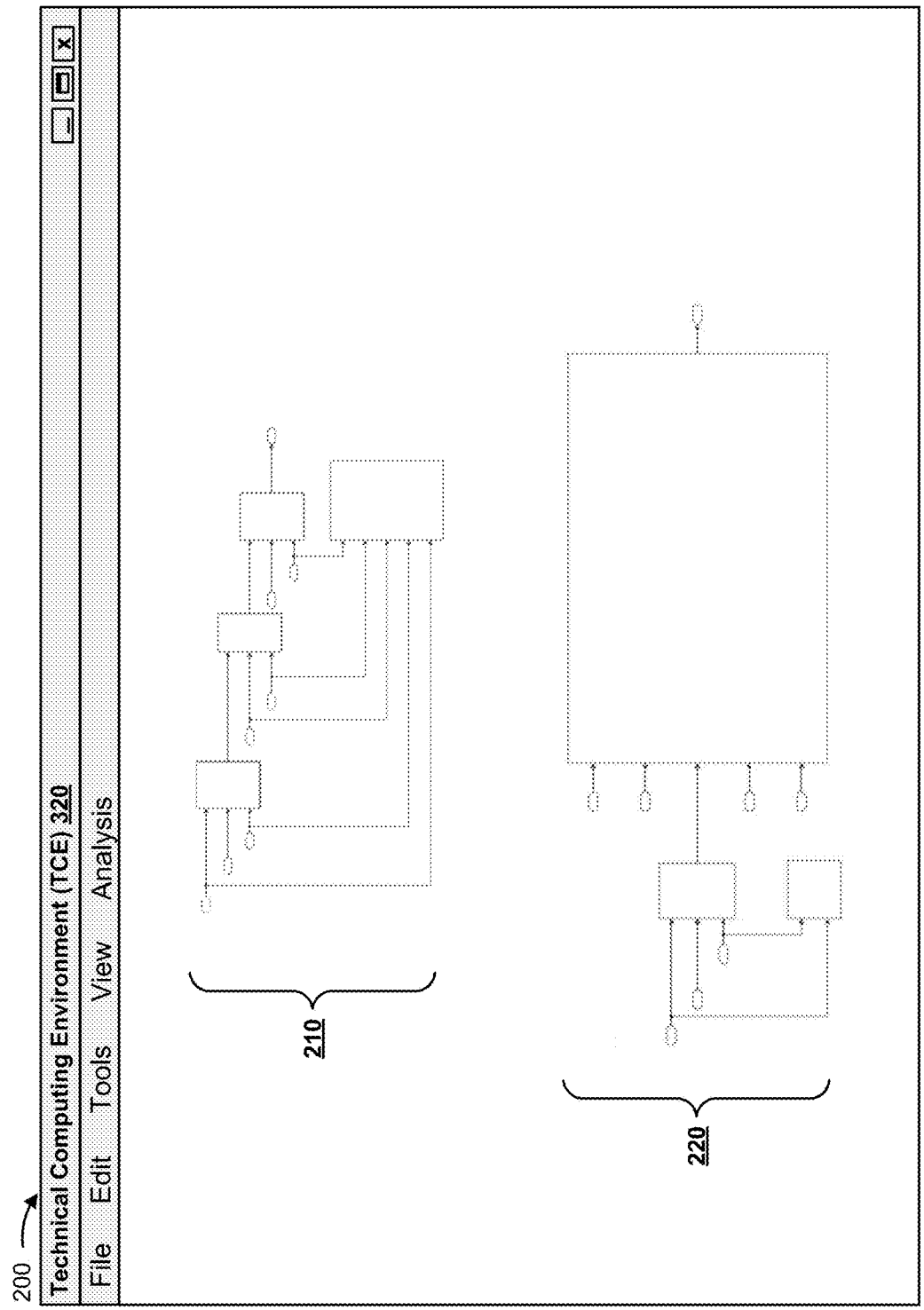
FIGS. 2A-2E are diagrams of an overview of another example implementation described herein.

FIGS. 2A-2E are diagrams of an overview of an example implementation 200 described herein. As shown in FIG. 2A, TCE 320 may display rules stored, for example, at a device. For example, the device may store rules, associated with grouping model elements into network units and/or grouping element metrics into network metrics, in a rule repository, such as a rule repository that enables the user to select one or more rules. In some implementations, the rules may include rules that the user created using TCE 320. In some implementations, an inference engine may process the rules for inclusion in a knowledge base.

In some implementations, the rules may include constraints, such as numerical restrictions on inputs to model elements. Additionally, or alternatively, the rules may include a set of model elements. For example, the device may use the rules to identify patterns of model elements in a model for grouping as a network unit and may apply particular test generation objectives when the device identifies a pattern of model elements matching the rule, as described below. In some implementations, the rules may be recursive (e.g., may be self-referencing), may be applied multiple times in a particular model, and/or may be applied to multiple models.

As shown, TCE 320 may display a rule 210 (e.g., a composite of model elements) created by the user (e.g., created using an application programming interface (API), textual language, Backus-Naur form notation, and/or using model elements). In some implementations, the device may receive an indication, in association with the user creating rule 210, that the user has selected model elements in a library of model elements as matching rule 210. Additionally, or alternatively, the device may receive an indication, in association with the user creating rule 210, that the user has selected model elements from an existing model as matching rule 210.

In some implementations, rule 210 may include model elements. For example, rule 210 may include port elements (e.g., control port elements, inport elements, or outport elements, shown as ovals). As another example, rule 210 may include one or more other model elements, such as a switch element, a min/max element, or an input constraint element, shown as rectangles. As shown, TCE 320 may display a rule 220, different from rule 210, created by the user. For example, the rule may include port elements. As another example, the rule may include one or more other model elements, such as switch elements (e.g., a switch input constraint element and a cascaded switch element).

In some implementations, the composite of model elements matching the rule may include a variant, such as a model element variant, a subsystem variant, or an inline variant. For example, the composite of model elements may include a variant that includes an alternative structure (e.g., with alternative characteristics) or an alternative implementation for a particular model element. This enables a single rule to include variations of the composite of model elements, such as variations of model elements or subsystems included in the included in the composite of model elements. This reduces or eliminates the need to create separate composites of model elements for variations of a particular rule, thereby increasing an efficiency of generating rules.

Figure 2B:
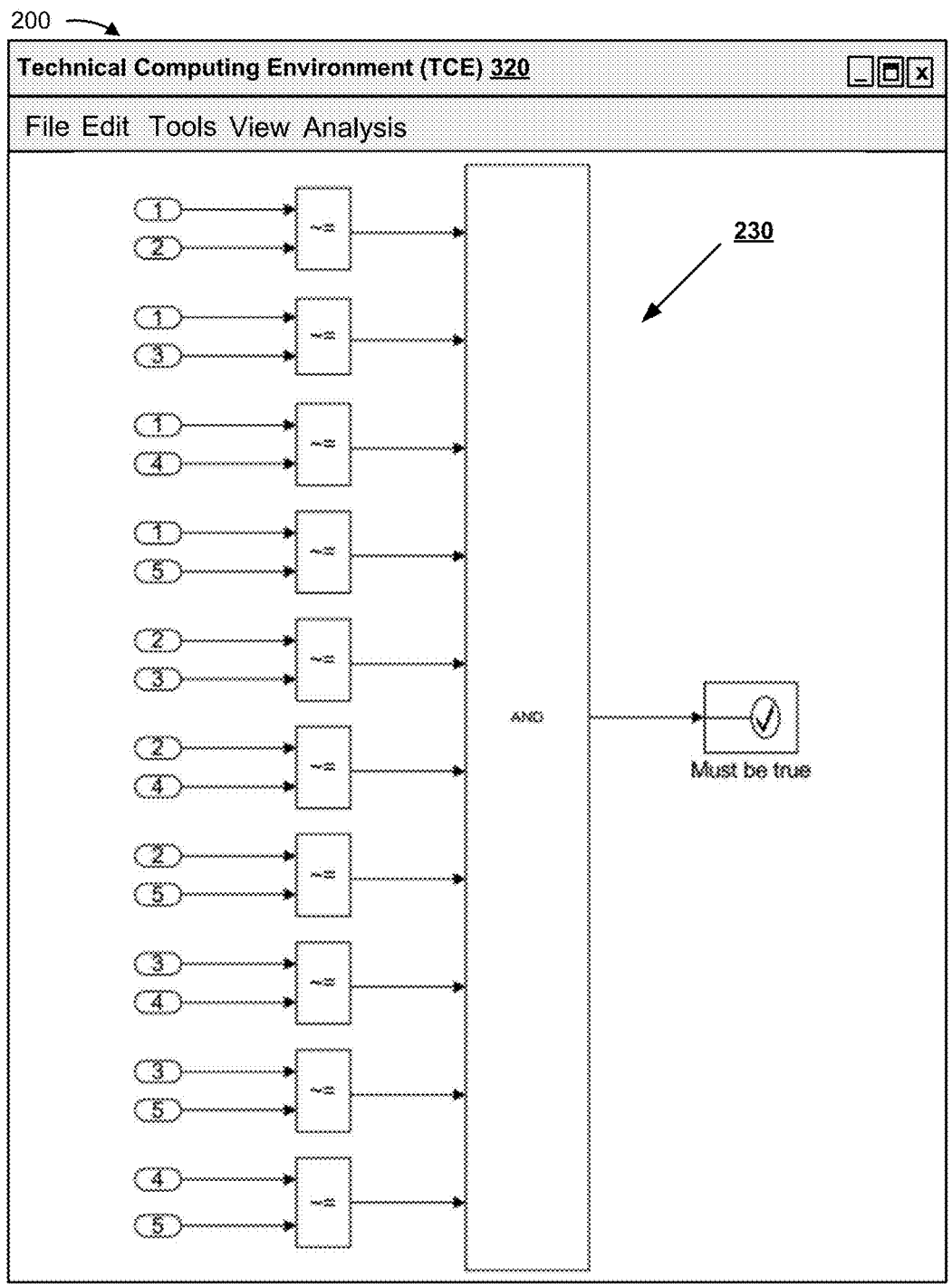
Figure 2C:
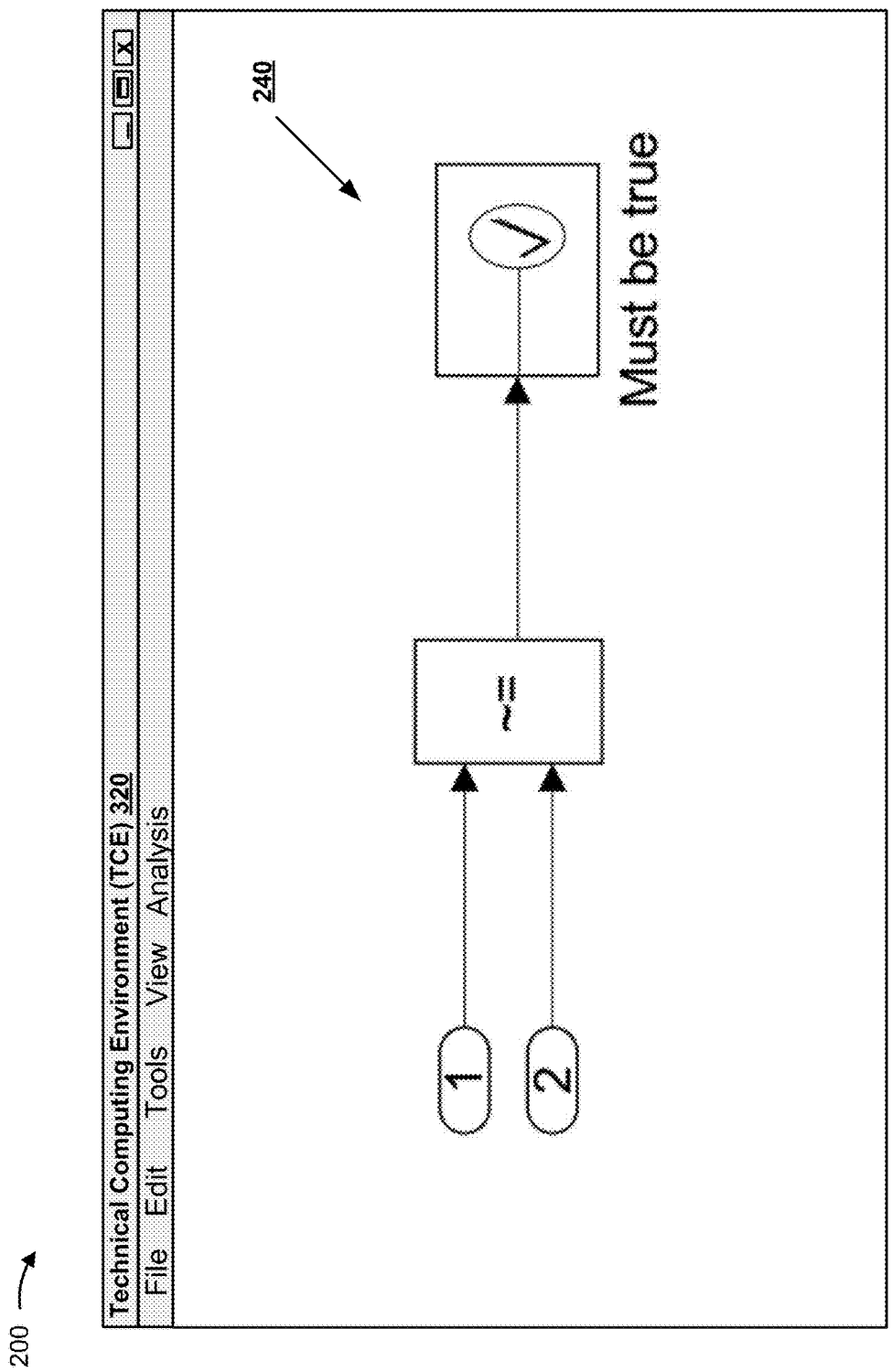

As shown in FIGS. 2B and 2C, the device may generate test generation objectives 230 and 240 based on user interaction with TCE 320. As shown in FIGS. 2B and 2C, the test generation objectives may be represented by a composite of model elements. Test generation objectives are described in more detail elsewhere herein. In some implementations, the device may apply test generation objective 230 and/or test generation objective 240 when rule 210 and/or rule 220 are satisfied (e.g., when the device identifies a pattern of model elements that match rule 210 and/or 240).

Figure 2D:
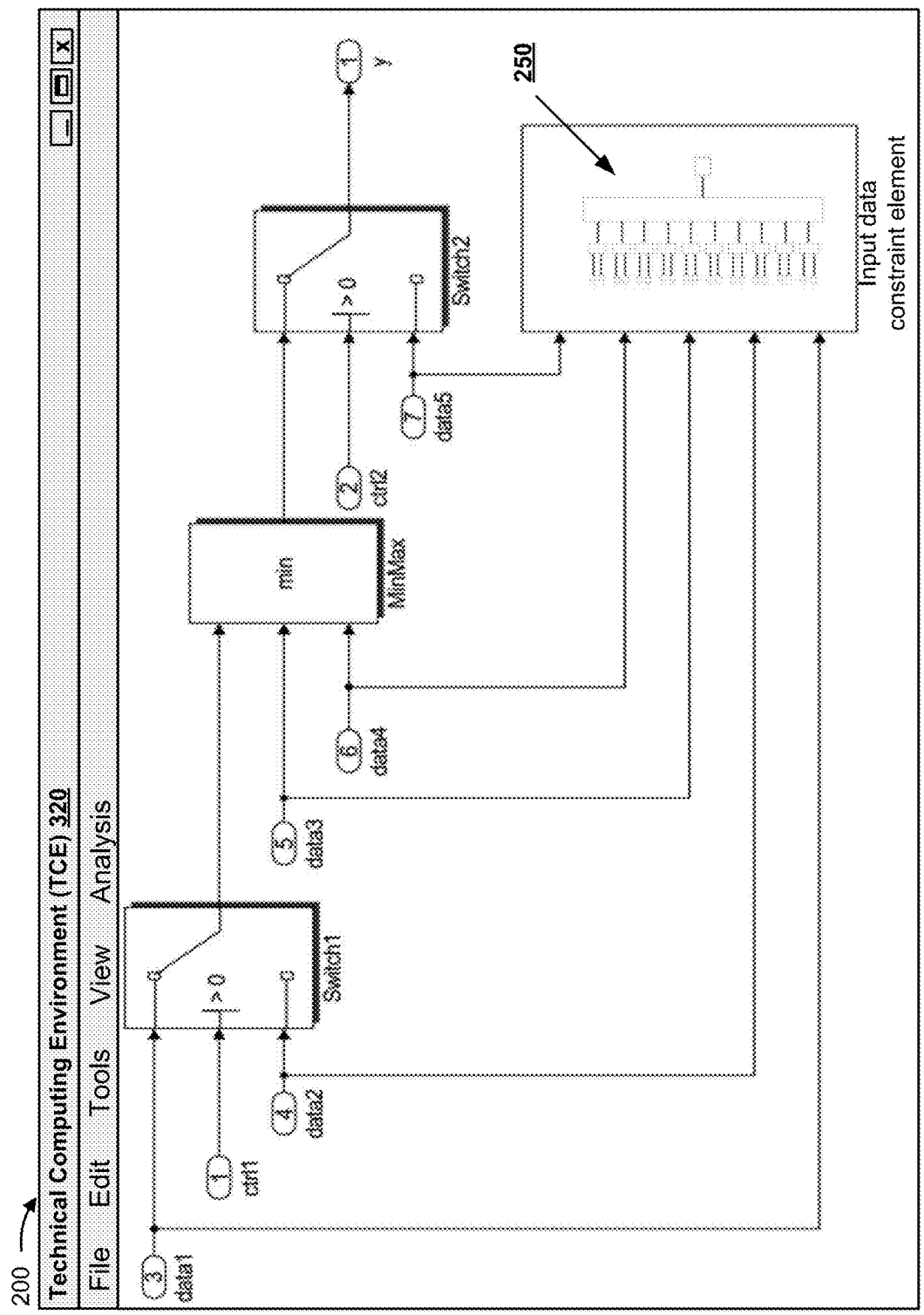

As shown in FIG. 2D, assume, for example, that the device has identified a pattern of model elements associated with a model that matches a pattern of model elements associated with rule 210. Further assume, for example, that the user has defined rule 210 to apply test generation objective 230 to a model when rule 210 is satisfied. As shown by reference number 250, the device may apply test generation objective 230 to the model by inserting test generation objective 230 into the input data constraint element of the model, thereby constraining inputs to the model.

Figure 2E:
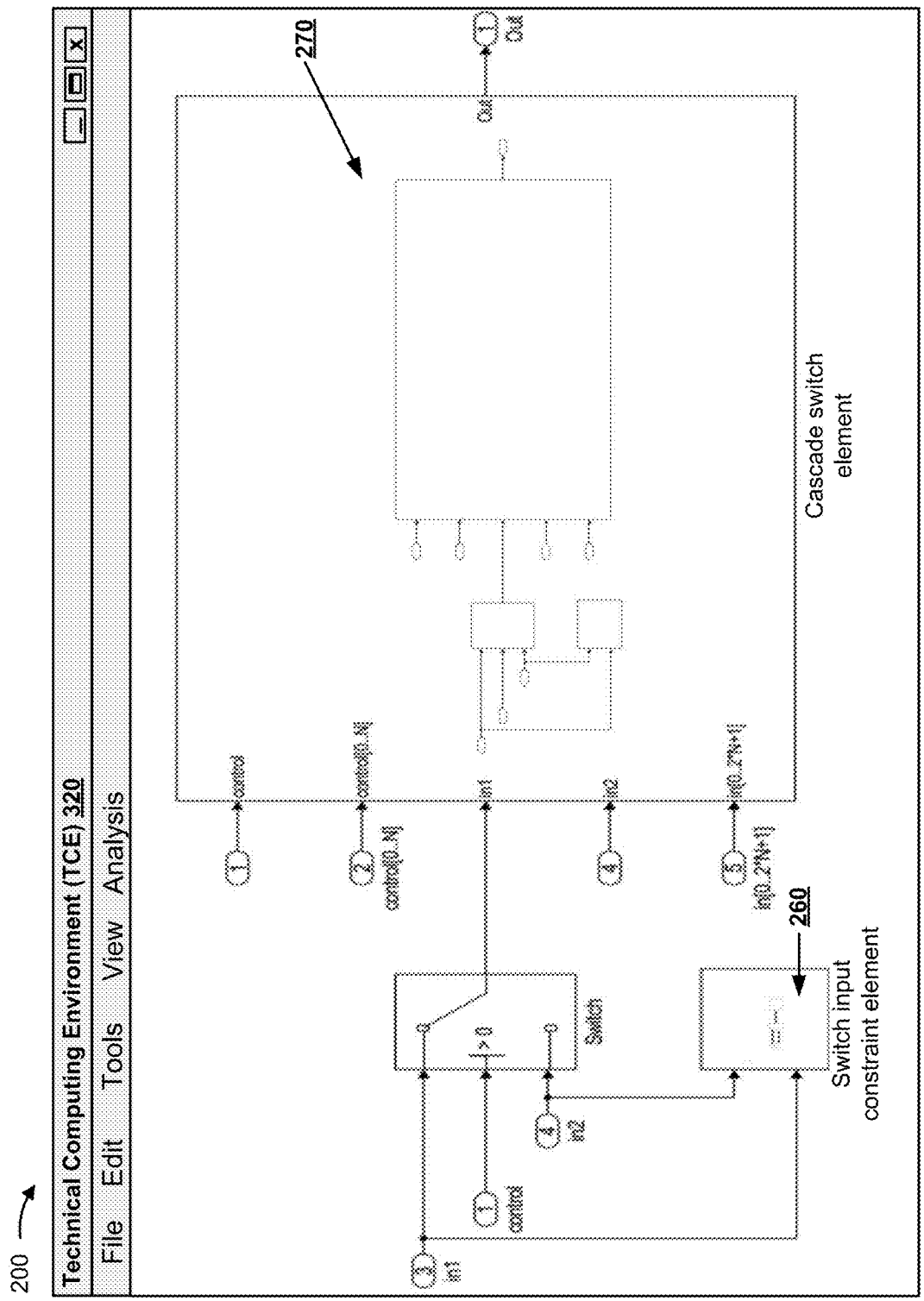

As shown in FIG. 2E, assume, for example, that the device has identified a pattern of model elements associated with a model that satisfies rule 220. Further assume, for example, that the user has defined rule 220 to apply test generation objective 240 to a model when rule 220 is satisfied. Further assume, for example, that rule 220 is recursive. As shown by reference number 260, the device may apply rule 220 to the model by inserting test generation objective 240 into the switch input constraint element of the model, thereby constraining inputs to the model. As shown by reference number 270, the device may further apply rule 220 by inserting rule 220 into a cascade switch element of the model based on rule 220 being recursive.

In this way, a device enables a user to customize rules for verification of a model. This improves an efficacy of verification of the model by providing the user with increased control over model verification via rule customization.

Figure 3:
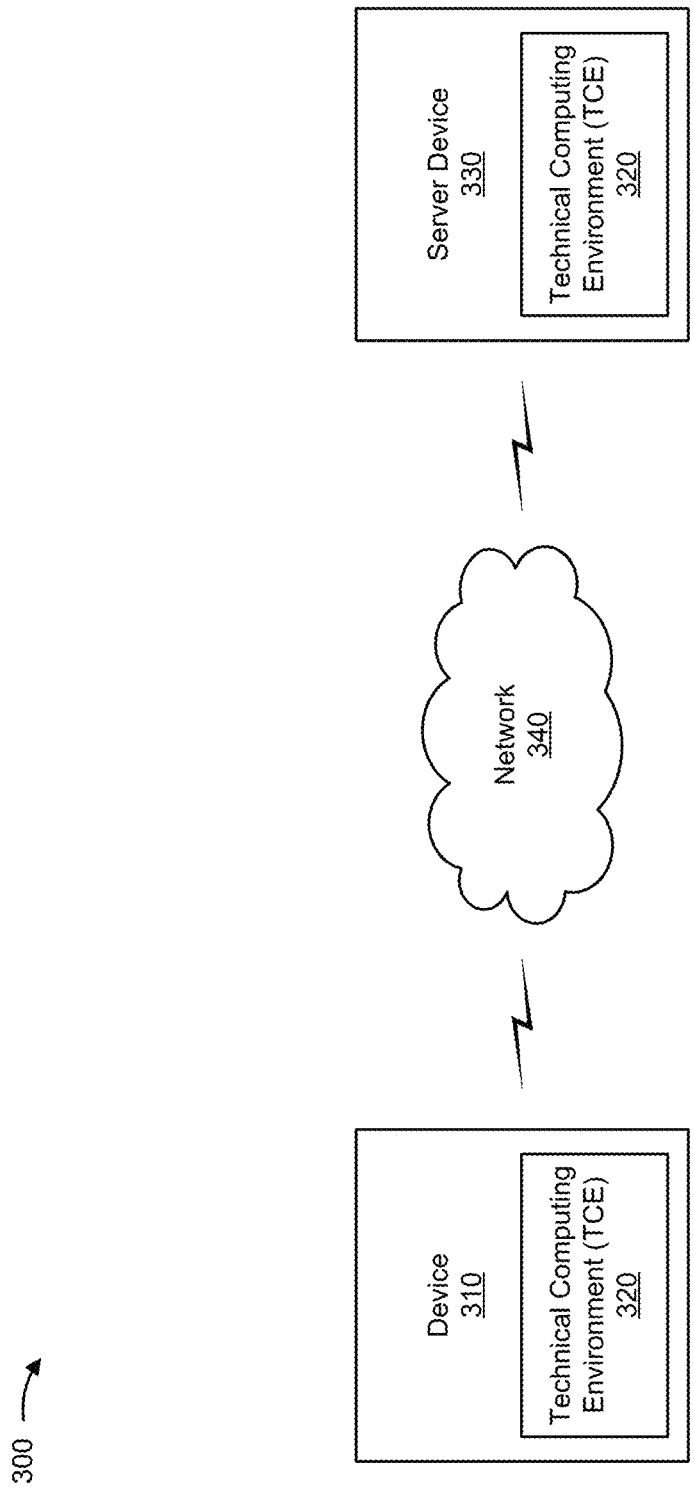
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a device 310, which may include a TCE 320. Furthermore, environment 300 may include a server device 330, which may include TCE 320, and a network 340. Devices of environment 300 may interconnect via wired connections, wireless connections, or a combination of wired and wireless connections.

Device 310 includes one or more devices capable of receiving, generating, storing, processing, and/or providing information associated with partitioning a model into network units. For example, device 310 may include a computing device, such as a desktop computer, a laptop computer, a tablet computer, a mobile phone (e.g., a smart phone, a radiotelephone, etc.), or a similar device. In some implementations, device 310 may receive information from and/or transmit information to server device 330.

Device 310 may host TCE 320. TCE 320 includes any hardware-based component or a combination of hardware and software-based components that provides a computing environment that allows tasks to be performed (e.g., by users) related to disciplines, such as, but not limited to, mathematics, science, engineering, medicine, and business. TCE 320 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 320 may include, for example, a user interface that permits a user to view model elements and/or network units associated with a model. In some implementations, TCE 320 may permit the user to create and/or modify the model elements via interaction with TCE 320. Additionally, or alternatively, TCE 320 may provide one or more user interfaces and the user may interact with the user interfaces to cause TCE 320 to partition the model into network units in association with model verification and/or to generate tests to verify the model.

Server device 330 may include one or more devices capable of receiving, generating, storing, processing, and/or providing information associated with partitioning a model into network units. For example, server device 330 may include a computing device, such as a server, a desktop computer, a laptop computer, a tablet computer, or a similar device. In some implementations, server device 330 may host TCE 320. In some implementations, device 310 may be used to access one or more TCEs 320 running on one or more server devices 330. For example, multiple server devices 330 may be used to execute program code (e.g., serially or in parallel), and may provide respective results of executing the program code to device 310.

In some implementations, device 310 and server device 330 may be owned by different entities. For example, an end user may own device 310, and a third party may own server device 330. In some implementations, server device 330 may include a device operating in a cloud computing environment. In this way, front-end applications (e.g., a user interface) may be separated from back-end applications (e.g., program code execution). Additionally, or alternatively, server device 330 may perform one, more, or all operations described elsewhere herein as being performed by device 310.

Network 340 may include one or more wired and/or wireless networks. For example, network 340 may include a cellular network, a public land mobile network (PLMN), a local area network (LAN), a wide area network (WAN), a metropolitan area network (MAN), a telephone network (e.g., a Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
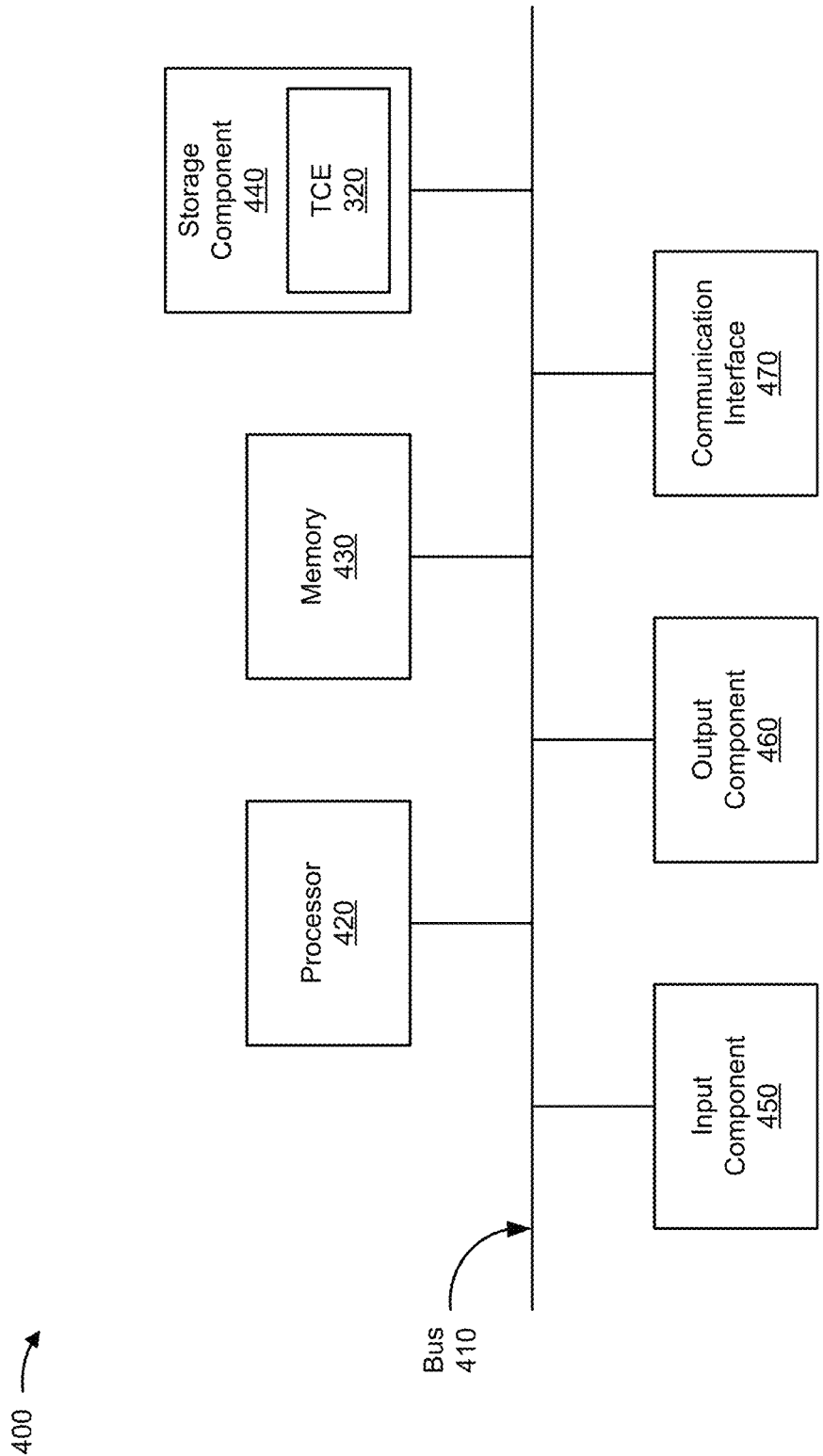
FIG. 4 is a diagram of example components of one or more devices of FIG. 3.

FIG. 4 is a diagram of example components of a device 400. Device 400 may correspond to device 310 and/or server device 330. In some implementations, device 310 and/or server device 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
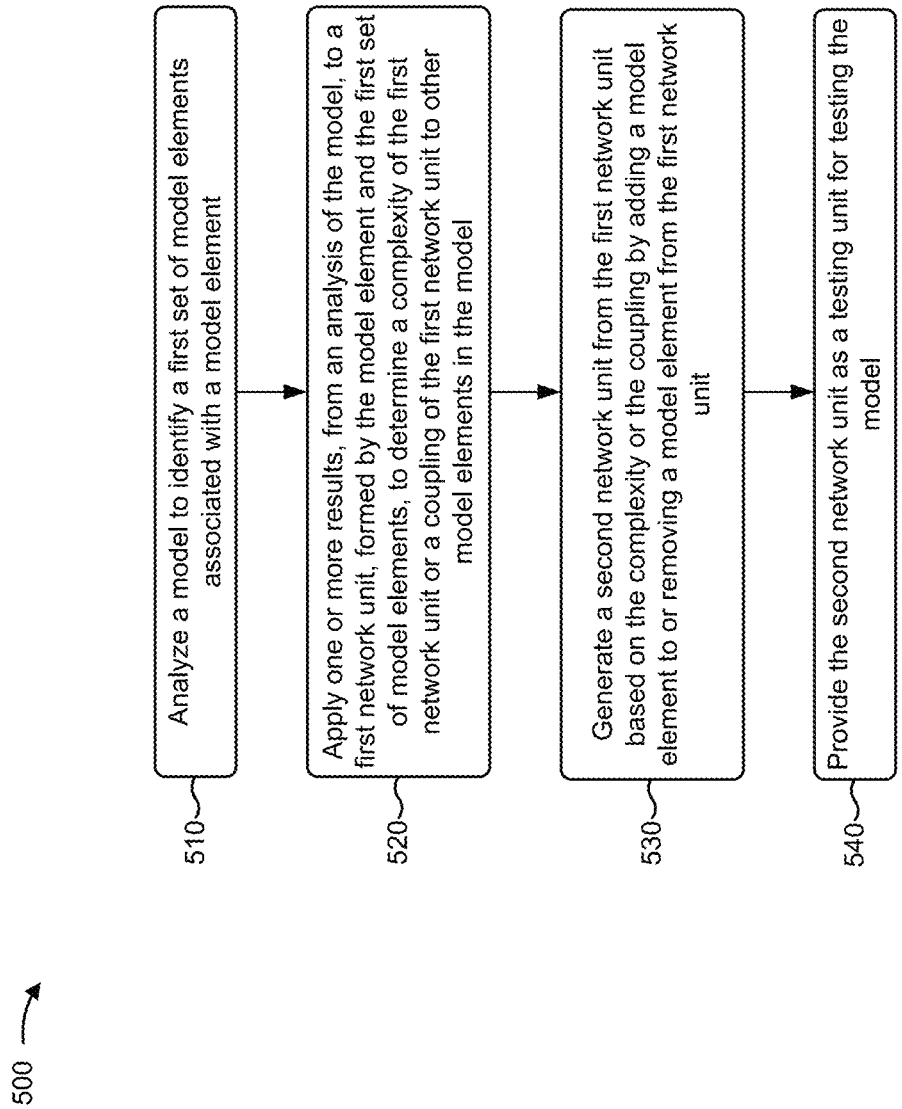
FIG. 5 is a flow chart of an example process for generating a network unit representing a hierarchy of computation.

FIG. 5 is a flow chart of an example process 500 for generating a network unit representing a hierarchy of computation. In some implementations, one or more process blocks of FIG. 5 may be performed by device 310. In some implementations, one or more process blocks of FIG. 5 may be performed by another device or a group of devices separate from or including device 310, such as server device 330.

As shown in FIG. 5, process 500 may include analyzing a model to identify a first set of model elements associated with a model element (block 510). For example, a model, such as a textual model, a graphical model, or a model that includes a textual component and a graphical component, may include model elements (e.g., model elements that depend on other model elements and/or model elements that do not depend on other model elements), where at least some of the model elements include one or more numeric expressions and represent one or more computations. In some implementations, the one or more numeric expressions may include variables and expressions that correspond to values of one or more data types, such as a floating data type in compliance with Institute of Electrical and Electronics Engineers (IEEE) standard 754, a fixed point data type, or an integer data type. Additionally, or alternatively, the one or more numeric expressions may include one or more callouts to functions, or may include a numeric runtime library. In some implementations, the first set of model elements and the model element form a first network unit that represents a first hierarchy of computation (e.g., a set of related model elements grouped together for testing). In some implementations, the model element may be associated with one or more other model elements (e.g., connected to or dependent on the one or more other model elements).

In some implementations, device 310 may analyze the model to identify the first set of model elements that are associated with the model element. For example, device 310 may analyze a relationship between one or more computations represented by the first set of model elements and one or more computations represented by the model element. In some implementations, device 310 may analyze the relationship based on a set of rules. For example, the set of rules may include a text-based rule or a rule generated from graphical affordances (e.g., information displayed graphically). In some implementations, the set of rules may be customizable by the user (e.g., via an API).

In this way, device 310 may analyze a model to identify a set of related model elements, which enables device 310 to partition the model.

As further shown in FIG. 5, process 500 may include applying one or more results, from an analysis of the model, to a first network unit, formed by the model element and the first set of model elements, to determine a complexity of the first network unit or a coupling of the first network unit to other model elements in the model (block 520). For example, device 310 may perform an analysis, such as an analysis to determine a complexity of the first network unit or an analysis to determine a coupling of the first network unit. In some implementations, the analysis may produce one or more results, and device 310 may apply the one or more results from the analysis to generate network units for testing.

In some implementations, the one or more results from the analysis may include a result of a model element type analysis (e.g., an analysis to determine a type of a model element, such as a switch element or a min/max element). Additionally, or alternatively, the one or more results may include a result of a model element connectivity analysis (e.g., an analysis to determine which model elements are connected). Additionally, or alternatively, the one or more results may include a result of a model element static dependency analysis (e.g., an analysis to determine which model elements depend on output from another model element). Additionally, or alternatively, the one or more results from the analysis may include an active element analysis to identify model elements that are active in a time window during a dynamic simulation of the model.

Additionally, or alternatively, the one or more results of the analysis may include a result of a dead logic analysis (e.g., an analysis to determine non-functional logic or inactive execution paths). In some implementations, when device 310 identifies dead logic, the one or more model elements that are related to the one or more results may include one or more model elements in the second network unit that are not executed.

In some implementations, device 310 may use the one or more results from the analysis to determine a further partitioning of the first network unit into a second network unit. For example, device 310 may further partition the first network unit based on the one or more results by removing model elements from the first network unit and forming the second network unit using the removed model elements. In some implementations, device 310 may add model elements to the first network based on the one or more results of the analysis, such as when a rule indicates combining model elements of the first network unit and another network unit, thereby forming the second network unit. Additionally, or alternatively, device 310 may combine another network unit with the first network unit to form the second network unit In this way, device 310 may determine a complexity or a coupling of a network unit, which enables device 310 to further partition the network unit.

As further shown in FIG. 5, process 500 may include generating a second network unit from the first network unit based on the complexity or the coupling by adding a model element to or removing a model element from the first network unit (block 530). For example, device 310 may generate a second network unit representing a second hierarchy of computation based on the one or more results of the analysis. In some implementations, the generating may include generating the second unit by adding one or more additional model elements of the model into the first network unit. For example, a result of the analysis may indicate that a model element included in the first network unit is connected with or dependent on a model element not included in the first network unit, in which case device 310 may add the model element not included in the first network unit to the first network unit.

Additionally, or alternatively, the generating may include generating the second network unit by removing one or more model elements of the first network unit from the first network unit. For example, a result of the analysis may indicate that a complexity of the first network unit may be reduced below a threshold complexity by removing a model element from the first network unit, in which case device 310 may remove the model element from the first network unit.

In some implementations, the second network unit may include one or more Boolean expressions, one or more control expressions (e.g., if/else expressions or while statements), and/or one or more saturations (e.g., a limit range of an input value). In some implementations, model elements of the second network unit may be grouped as a single unit for testing the model (e.g., a testing unit). In some implementations, device 310 may form other network units as testing units, where the other network units have different sizes from the second network unit and represent different hierarchies of computation than the second hierarchy of computation. In this way, device 310 may generate a network unit for testing, thereby enabling device 310 to generate fewer test generation objectives (e.g., relative to generating test generation objectives for model elements rather than network units). This conserves computing resources of device 310 when device 310 generates test generation objectives associated with the testing.

As further shown in FIG. 5, process 500 may include providing the second network unit as a testing unit for testing the model (block 540). For example, device 310 may provide the second network unit for testing. In some implementations, the second network unit may include two or more model elements and one or more numeric expressions.

In some implementations, device 310 may display the second network unit and at least some of the other model elements of the model on a user interface. Additionally, or alternatively, device 310 may display the one or more results of the analysis on the user interface. In some implementations, when displaying the results of the analysis, device 310 may display one or more model elements that are related to the one or more results differently from other model elements displayed on the user interface.

In some implementations, device 310 may display graphical affordances for visualizing network units. For example, the graphical affordances for visualizing the network units may include color coding, collapsible/expandable model elements, masking affordances (e.g., graphical affordances that indicate operations that mask the effects of particular operations, such as multiplication by zero), network units displayed in a library of network units, etc. Additionally, or alternatively, device 310 may display graphical affordances for visualizing metrics and/or the satisfaction of metrics. For example, the graphical affordances for visualizing the metrics may include graphical affordances to visualize network metrics and/or element metrics, such as element metrics of the model elements included in a network unit. As another example, the graphical affordances for visualizing the metrics may include graphical affordances to visualize satisfaction of network metrics during execution of the model (e.g., across multiple time periods of a model simulation).

In some implementations, device 310 may generate one or more metrics for testing the second network unit. For example, device 310 may receive an input from the user when generating the one or more metrics. In some implementations, device 310 may apply an algorithm to generate test generation objectives based on the input from the user when generating the one or more metrics. In some implementations, device 310 may apply the algorithm to generate instructions for measuring satisfaction of the one or more metrics or to annotate the test generation objectives.

In some implementations, generating the one or more metrics may include analyzing one or more element metrics of individual model elements of the second network unit. In some implementations, generating the one or more metrics may include generating the one or more metrics based on one or more rules and the one or more element metrics. In some implementations, the one or more rules may be customizable by a user (e.g., via a user interface associated with device 310). In some implementations, device 310 may generate the one or more tests (e.g., model verification tests) based on the one or more metrics.

In some implementations, device 310 may display the second network unit and at least some of the other model elements of the model on a user interface. Additionally, or alternatively, device 310 may display a chain of model elements in the second network unit that is a test generation objective of one of the one or more metrics differently from other model elements displayed on the user interface.

In this way, device 310 may provide a network unit for testing and/or display, thereby improving an efficacy of model verification by isolating particular portions of the model for testing and providing a user with increased visibility and/or control over the model verification.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
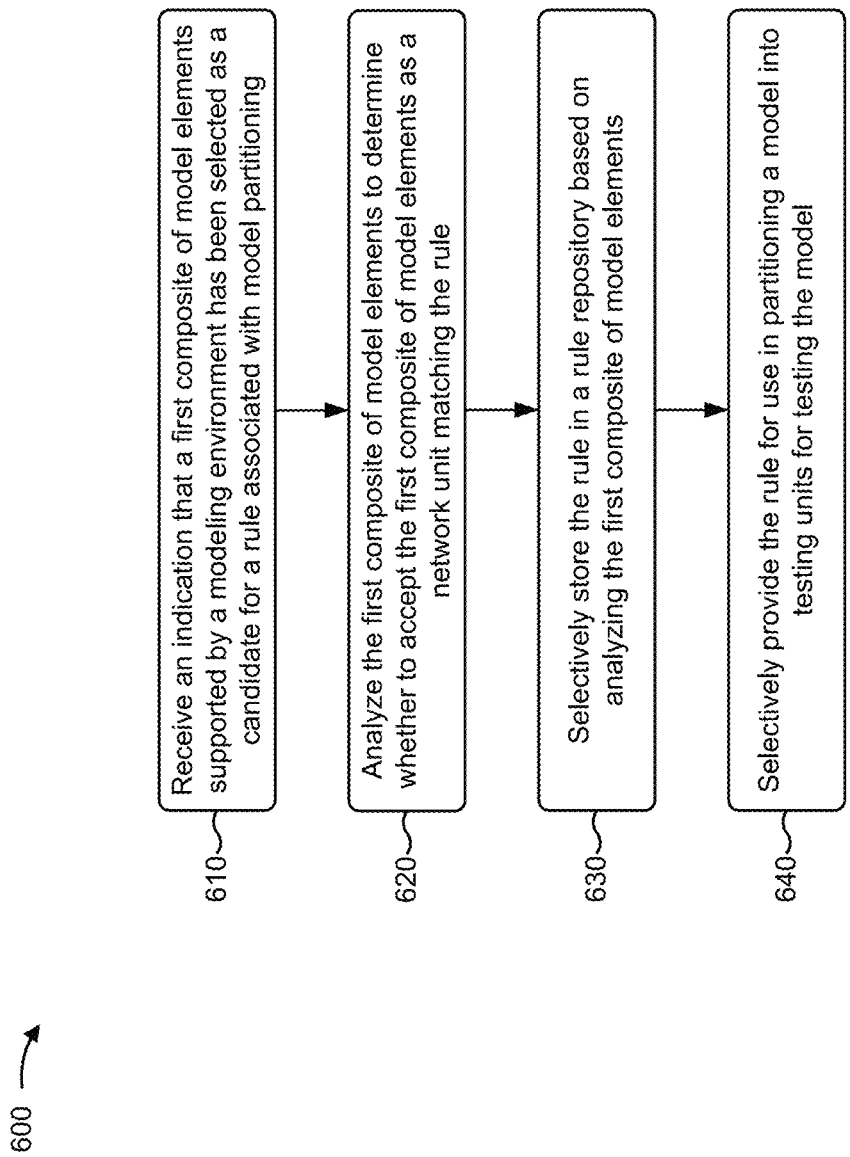
FIG. 6 is a flow chart of an example process for selectively providing a rule for use in partitioning a model.

FIG. 6 is a flow chart of an example process 600 for selectively providing a rule for use in partitioning a model. In some implementations, one or more process blocks of FIG. 6 may be performed by device 310. In some implementations, one or more process blocks of FIG. 6 may be performed by another device or a group of devices separate from or including device 310, such as server device 330.

As shown in FIG. 6, process 600 may include receiving an indication that a first composite of model elements supported by a modeling environment has been selected as a candidate for a rule associated with model partitioning (block 610). For example, device 310 may receive an indication, in a modeling environment in which models are generated in a modeling language, that a group of model elements (e.g., subsystems, operations, expressions, or variants) has been selected as a candidate for a rule. In some implementations, device 310 may receive the indication in association with a user of device 310 selecting the first composite of model elements. In some implementations, device 310 may use the rule to partition a model that includes the first composite of model elements.

In some implementations, at least some model elements of the first composite of model elements may be connected. Additionally, or alternatively, at least some of the model elements of the first composite of model elements may include one or more numeric expressions, and may represent one or more computations. In some implementations, the first composite of model elements may be usable as a unit in generating models in the modeling environment. For example, the first composite of model elements may be usable as a network unit in generating models. Additionally, or alternatively, the first composite of model elements may be in the same modeling language as the models generated in the modeling environment.

As further shown in FIG. 6, process 600 may include analyzing the first composite of model elements to determine whether to accept the first composite of model elements as a network unit matching the rule (block 620). For example, device 310 may analyze the first composite of model elements. In some implementations, device 310 may analyze a relationship, such as a complexity relationship, a connectivity relationship, or a dependency relationship, among computations represented by the model elements of the first composite of model elements in association with analyzing the first composite of model elements.

In some implementations, device 310 may analyze the first composite of model elements using a model element type analysis, a model element connectivity analysis, a model element static dependency analysis, or the like. In some implementations, device 310 may accept the first composite of model elements as a network unit matching the rule based on analyzing the first composite of model elements (e.g., based on applying a result of analyzing the first composite of model elements). For example, device 310 may accept the first composite of model elements when a complexity of the first composite of model elements is less than a threshold complexity. Conversely, for example, device 310 may reject the first composite of model elements when a complexity of the first composite of model elements is greater than a threshold complexity or when the first composite of model elements includes dead logic, includes an infinite execution loop, includes a syntax error, or the like.

In this way, device 310 may analyze a composite of model elements to determine whether to accept the composite of model elements as a network unit matching a rule. This conserves computing resources of device 310 by preventing device 310 from accepting, and attempting to use, a composite of model elements that may interfere with model verification.

As further shown in FIG. 6, process 600 may include selectively storing the rule in a rule repository based on analyzing the first composite of model elements (block 630). For example, device 310 may selectively store the rule in a library of rules using one or more processors. In some implementations, device 310 may store the first composite of model elements in association with the rule (e.g., as a set of model blocks or as a block diagram model). Additionally, or alternatively, device 310 may store the first composite of model elements in association with the rule based on a user selecting patterns of model elements from existing models.

In some implementations, device 310 may store the rule in the rule repository when a result of analyzing the first composite of model elements indicates accepting the first composite of model elements as the rule. Conversely, for example, device 310 may not store the rule in the rule repository when the result of analyzing the first composite of model elements indicates not accepting the first composite of model elements as the rule.

As further shown in FIG. 6, process 600 may include selectively providing the rule for use in partitioning a model into testing units for testing the model (block 640). For example, device 310 may selectively provide the first composite of model elements for use in partitioning the model into network units as the testing units. In some implementations, device 310 may provide the rule when a user selects the rule from the rule repository, and may not provide unselected rules.

In some implementations, device 310 may partition the model into testing units using the rule. For example, device 310 may identify the network unit within the model by comparing the model with the first composite of model elements and may partition the model into the network unit when the comparison indicates a match (e.g., a pattern match).

In this way, device 310 may partition a model into network units for testing using a composite of model elements, thereby improving an efficacy of verifying a model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
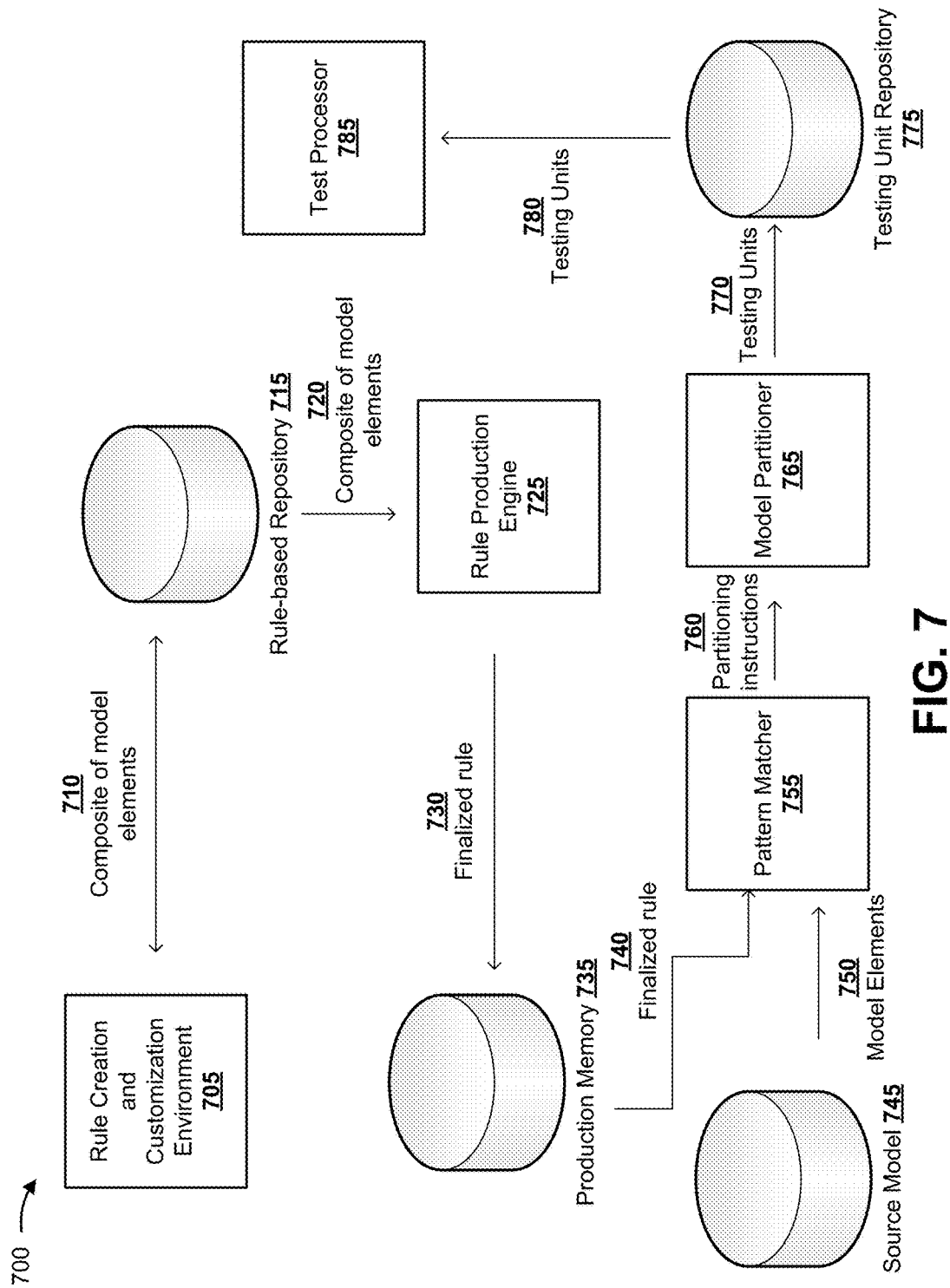
FIG. 7 is a diagram of an example environment in which systems and/or methods described herein, may be implemented.

FIG. 7 is a diagram of an overview of an example implementation 700 described herein. The environment shown in FIG. 7 may include a model-based environment in which a rule-based system for model testing and verification may be implemented. The environment of FIG. 7 may be implemented in one or more devices 310, one or more server devices 330, or a combination of one or more devices 310 and one or more server devices 330.

As shown in FIG. 7, the environment may include a rule creation and customization environment 705, a rule-based repository 715, a rule production engine 725, a production memory 735, a source model 745, a pattern matcher 755, a model partitioner 765, a testing unit repository 775, and/or a test processor 785. In some implementations, rule creation and customization environment 705 may include a software system provided within TCE 320. For example, rule creation and customization environment 705 may include a modeling environment or language that permits a user to create and/or customize rules for testing and/or verifying a model (e.g., via a user interface).

In some implementations, rule creation and customization environment 705 may permit the user to create and/or customize a rule as a composite of model elements. The rule can be in the same language as the model elements. The composite of model elements can be a selection of model elements from an existing model, a model being or to be built, or a component of a library of the modeling environment. For example, rule creation and customization environment 705 may permit the user to create a new rule by, for example, creating a new composite of model elements. As another example, rule creation and customization environment 705 may permit the user to customize an existing rule by, for example, modifying an existing composite of model elements.

In some implementations, rule creation and customization environment 705 may analyze the composite of model elements. For example, rule creation and customization environment 705 may analyze the composite of model elements to determine whether to accept the composite of model elements, as described in more detail elsewhere herein. In some implementations, rule creation and customization environment 705 may modify the composite of model elements based on analyzing the composite of model elements. For example, rule creation and customization environment 705 may add model elements to the composite of model elements, remove model elements from the composite of model elements, or group model elements of the composite of model elements, as described in more detail elsewhere herein.

As shown in FIG. 7, and by reference number 710, rule creation and customization environment 705 may provide the composite of model elements (e.g., created or customized by the user) to rule-based repository 715. Additionally, or alternatively, rule creation and customization environment 705 may receive, and provide for display, a composite of model elements stored in rule-based repository 715, such as to permit the user to customize the composite of model elements.

In some implementations, rule-based repository 715 may include one or more memory components capable of receiving, storing, and/or providing a composite of model elements. For example, rule-based repository 715 may include a memory component capable of storing a composite of model elements created and/or customized using rule creation and customization environment 705. In some implementations, rule-based repository 715 may store the composite of model elements as a script, as a set of model elements, or as a set of library blocks in a library.

As shown in FIG. 7, and by reference number 720, rule-based repository 715 may provide the composite of model elements to rule production engine 725 for processing. In some implementations, rule production engine 725 may include a software system capable of processing a composite of model elements received from rule-based repository 715. For example, rule production engine 725 may create, or infer, a finalized rule, or a production rule, that can produce network units (e.g., by processing the composite of model elements), as described below. In some implementations, rule production engine 725 may create a finalized rule based on the types of model elements included in the composite of model elements, properties of the model elements included in the composite of model elements, etc.

In some implementations, rule production engine 725 may modify the composite of model elements (e.g., based on analyzing the composite of model elements, as described in more detail elsewhere herein). For example, rule production engine 725 may add model elements to the composite of model elements, remove model elements from the composite of model elements, or group model elements of the composite of model elements, as described in more detail elsewhere herein.

As shown in FIG. 7, and by reference number 730, rule production engine 725 may provide the finalized rule to production memory 735 for storage. For example, rule production engine 725 may provide the finalized rule to production memory 735 in association with processing the composite of model elements from rule-based repository 715. In some implementations, production memory 735 may include one or more memory components capable of receiving, storing, and/or providing a finalized rule. Additionally, or alternatively, production memory 735 may include one or more memory components capable of receiving, storing, and/or providing a hard-coded finalized rule (e.g., a finalized rule, or a production rule, not processed by rule production engine 725). In some implementations, production memory 735 may provide the hard-coded finalized rule to rule creation and customization environment 705 (e.g., via rule production engine 725 and rule-based repository 715) to enable the user to customize the hard-coded finalized rule.

As shown by reference number 740, production memory 735 may provide the finalized rule to pattern matcher 755. As shown by reference number 750, source model 745 may provide model elements to pattern matcher 755. In some implementations, pattern matcher 755 may include a software system capable of matching patterns of model elements. For example, pattern matcher 755 may match patterns of model elements by comparing model elements included in the finalized rule and model elements received from source model 745. In some implementations, pattern matcher 755 may use a graph-theoretical mechanism, or a similar mechanism, to match the patterns of model elements.

As shown by reference number 760, pattern matcher 755 may provide partitioning instructions to model partitioner 765. For example, pattern matcher 755 may provide partitioning instructions that indicate a manner in which model partitioner 765 is to partition the model elements from source model 745 based on the patterns identified by pattern matcher 755. In some implementations, model partitioner 765 may include a software system capable of partitioning model elements of source model 745. For example, model partitioner 765 may partition the model elements using the partitioning instructions received from pattern matcher 755. In some implementations, model partitioner 765 may generate testing units (e.g., network units) based on partitioning the model elements.

As shown by reference number 770, model partitioner 765 may provide the testing units to testing unit repository 775. In some implementations, testing unit repository 775 may include one or more memory components capable of receiving, storing, and/or providing testing units. For example, testing unit repository 775 may receive, store, and/or provide the testing units to enable test processor 785 to test and/or verify source model 745.

As shown by reference number 780, testing unit repository 775 may provide the testing units to test processor 785. In some implementations, test processor 785 may include a software system capable of receiving testing units and using the testing units to test and/or verify source model 745. In some implementations, test processor 785 may provide information, associated with the testing and/or verification, for display to a user.

In some implementations, test processor 785 may generate tests to test the testing units. For example, test processor 785 may generate tests based on network metrics associated with the testing units. As another example, test processor 785 may generate tests based on user input (e.g., user input to generate network metrics). Test generation is described in more detail elsewhere herein.

As indicated above, FIG. 7 is provided merely as an example. Other examples are possible and may differ from what was described with regard to FIG. 7. For example, the environment of FIG. 7 may be implemented without rule creation and customization environment 705, rule-based repository 715, and/or rule production engine 725. In this case, model partitioning may be performed using hard-coded finalized rules stored in production memory 735 (e.g., rather than using rules created and/or customized by a user).

Implementations described herein enable a device to partition a model into network units for model verification. In addition, the user may customize rules for partitioning the model into network units. This improves an efficacy of model verification by enabling the device to perform model verification on a group of model elements as a single unit and by providing the user with increased control over the model verification.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
for a model comprising model elements, where at least some of the model elements:
comprise one or more numeric expressions, and represent one or more computations,
analyzing, by one or more processors, the model to identify a first set of model elements that are associated with a model element, where:
the analyzing comprises analyzing a relationship between one or more computations represented by the first set of model elements and one or more computations represented by the model element, and
the first set of model elements and the model element form a first network unit that represents a first hierarchy of computation;
applying, by the one or more processors, one or more results from an analysis of the model to the first network unit to determine a complexity of the first network unit or a coupling of the first network unit to other model elements of the model;
generating, by the one or more processors, a second network unit, representing a second hierarchy of computation, from the first network unit based on the determined complexity of the first network unit or the determined coupling of the first network unit to the other model elements of the model, where the generating comprises modifying the first network unit to form the second network unit by:
adding one or more additional model elements of the model into the first network unit, or
removing one or more model elements of the first network unit from the first network unit;
providing, by the one or more processors, the second network unit as a testing unit for testing the model, the second network unit comprising two or more model elements that include at least one model element associated with a masking operation, at least one active element and at least one numeric expression of the one or more numeric expressions;
generating one or more network metrics for testing the second network unit based on one or more rules associated with connectivity of the two or more model elements of the second network unit and one or more element metrics, wherein the one or more network metrics include a criteria for passing an appropriate value according to the at least one model element associated with the masking operation via the at least one active element of the second network unit; and
generating one or more tests for the second network unit, wherein
the two or more model elements of the second network unit include a first model element implementing a first operation,
the first model element and the at least one model element associated with the masking operation arranged in a dependent configuration according to the one or more results from the analysis of the model, wherein the one or more results from the analysis of the model comprise a result of one of (i) a model element type analysis, (ii) a model element connectivity analysis, and (iii) a model element static dependency analysis; and
the one or more tests for the second network unit coordinate the first operation implemented by the first model element and the masking operation implemented by the at least one model element associated with the masking operation of the second network unit to prevent masking an effect of the first operation by the masking operation, based on the generated one or more network metrics.

2. The method of claim 1, wherein the second network unit comprises one or more Boolean expressions, one or more control expressions, or one or more saturations, and wherein the one or more numeric expressions comprise variables and expressions that:
correspond to values comprising floating data type in compliance with Institute of Electrical and Electronics Engineers (IEEE) standard 754, fixed point data type, or integer data type,
comprise one or more callouts to functions, or
comprise a numeric runtime library.

3. The method of claim 1, further comprising performing the analysis.

4. The method of claim 1, wherein the one or more results from the analysis identify model elements that are active in a time window during a dynamic simulation of the model.

5. The method of claim 1, wherein the second network unit is for use as a single unit for testing the model.

6. The method of claim 1, further comprising forming other network units as testing units, the other network units having different sizes from the second network unit and representing different hierarchies of computation from the second hierarchy of computation.

7. The method of claim 1, wherein the analyzing the relationship is based on one or more rules that are customizable by a user.

8. The method of claim 7, wherein the one or more rules for the analyzing the relationship comprise a text-based rule or a rule generated from a graphical affordance.

9. The method of claim 7, further comprising providing an application programming interface for customizing the one or more rules for the analyzing the relationship.

10. The method of claim 1, wherein the model comprises a textual model, a graphical model, or a model that comprises a textual component and a graphical component.

11. The method of claim 1, wherein the generating the one or more network metrics comprises:
analyzing the one or more element metrics, wherein the one or more element metrics are of individual model elements of the second network unit.

12. The method of claim 11, where the one or more tests are based on the one or more network metrics.

13. The method of claim 11, wherein the one or more rules associated with the connectivity of the two or more model elements of the second network unit are customizable by a user.

14. The method of claim 11, further comprising:
displaying the second network unit and at least some of the other model elements of the model on a user interface; and
displaying a chain of model elements in the second network unit, that is a test generation objective of one of the one or more network metrics, differently from the at least some of the other model elements displayed on the user interface.

15. The method of claim 1, wherein the generating the one or more network metrics comprises:
receiving an input from a user; and
applying an algorithm to generate test generation objectives based on the input.

16. The method of claim 15, wherein the generating the one or more network metrics comprises:

applying the algorithm to generate instructions for measuring satisfaction of the one or more network metrics or to annotate the test generation objectives.

17. The method of claim 1, further comprising:
displaying the second network unit and at least some of the other model elements of the model on a user interface; and
displaying the one or more results of the analysis on the user interface, comprising:
displaying one or more model elements that are related to the one or more results differently from the at least some of the other model elements displayed on the user interface.

18. The method of claim 17, wherein the one or more results of the analysis comprise:
results of a dead logic analysis, and the one or more model elements that are related to the one or more results comprise one or more model elements in the second network unit that are not executed.

19. A method comprising:
in a modeling environment in which models are generated in a modeling language,
receiving an indication that a first composite of model elements, supported by the modeling environment, is selected as a candidate for a rule in partitioning a model that comprises the first composite of model elements, where:
at least some of the model elements of the first composite of model elements are connected,
two or more of the model elements of the first composite of model elements comprise a model element associated with a masking operation, an active element and numeric expressions,
the first composite of model elements is usable as a unit in generating the models or being part of the model in the modeling environment, and
the first composite of model elements is in the same modeling language as the models generated in the modeling environment;
analyzing, by one or more processors, the first composite of model elements to determine whether to accept the first composite of model elements as the rule, where:
the analyzing comprises analyzing a relationship among computations represented by the two or more of the model elements of the first composite of model elements;
selectively storing, by the one or more processors, the rule in a rule repository based on the analyzing the first composite of model elements;
selectively providing the rule for use in partitioning the model into testing units for testing the model; and
generating one or more network metrics for testing at least one of the testing units based on one or more rules associated with connectivity of model elements of the at least one of the testing units and one or more element metrics, where the one or more network metrics include a criteria for passing an appropriate value according to the model element associated with the masking operation via the active element of the first composite of model elements,
wherein
a first model element of the first composite of model elements and the model element associated with the masking operation are arranged in a dependent configuration according to one or more results from an analysis of the model, wherein the one or more results from the analysis of the model comprise a result of (i) a model element type analysis, (ii) a model element connectivity analysis, and (iii) a model element static dependency analysis and
the testing coordinates computations represented by the first model element and the model element associated with the masking operation to prevent masking an effect of the first model element based on the generated one or more network metrics.

20. The method of claim 19, wherein the analyzing comprises applying a result of analyzing the first composite of model elements.

21. The method of claim 19, wherein the first composite of model elements comprises subsystems, operations, expressions, or variants.

22. The method of claim 19, further comprising identifying a network unit within the model by comparing the model with the first composite of model elements.

23. The method of claim 19, where the first composite of model elements is accepted as a recursive rule,
the first composite of model elements being stored in a library.

24. The method of claim 19, where the first composite of model elements is selected from a library of the modeling environment.

25. The method of claim 19, where the first composite of model elements is selected using an existing model displayed in the modeling environment.

26. One or more non-transitory computer-readable media having stored thereon instructions that when executed by a computing device cause the computing device to perform operations comprising:
for a model comprising model elements, where at least some of the model elements:
comprise one or more numeric expressions, and
represent one or more computations,
analyzing, by one or more processors, the model to identify a first set of model elements that are associated with a model element, where:
the analyzing comprises analyzing a relationship between one or more computations represented by the first set of model elements and one or more computations represented by the model element, and
the first set of model elements and the model element form a first network unit that represents a first hierarchy of computation;
applying, by the one or more processors, one or more results from an analysis of the model to the first network unit to determine a complexity of the first network unit or a coupling of the first network unit to other model elements of the model;
generating, by the one or more processors, a second network unit, representing a second hierarchy of computation, from the first network unit based on the determined complexity of the first network unit or the determined coupling of the first network unit to the other model elements of the model, where the generating comprises modifying the first network unit to form the second network unit by:
adding one or more additional model elements of the model into the first network unit, or
removing one or more model elements of the first network unit from the first network unit;
providing, by the one or more processors, the second network unit as a testing unit for testing the model, the second network unit comprising two or more model elements that include at least one model element associated with a masking operation, at least one active element and at least one numeric expression of the one or more numeric expressions;

generating one or more network metrics for testing the second network unit based on one or more rules associated with connectivity of the two or more model elements of the second network unit and one or more element metrics, wherein the one or more network metrics include a criteria for passing an appropriate value according to the at least one model element associated with the masking operation via the at least one active element of the second network unit; and generating one or more tests for the second network unit, wherein the two or more model elements of the second network unit include a first model element implementing a first operation, the first model element and the at least one model element associated with the masking operation arranged in a dependent configuration according to the one or more results from the analysis of the model, wherein the one or more results from the analysis of the model comprise a result of one of (i) a model element type analysis, (ii) a model element connectivity analysis, and (iii) a model element static dependency analysis; and the one or more tests for the second network unit coordinate the first operation implemented by the first model element and the masking operation implemented by the at least one model element associated with the masking operation of the second network unit to prevent masking an effect of the first operation by the masking operation, based on the generated one or more network metrics.

27. The one or more non-transitory computer-readable media of claim 26, wherein the second network unit comprises one or more Boolean expressions, one or more control expressions, or one or more saturations, and wherein the one or more numeric expressions comprise variables and expressions that:

correspond to values comprising floating data type in compliance with Institute of Electrical and Electronics Engineers (IEEE) standard 754, fixed point data type, or integer data type, comprise one or more callouts to functions, or comprise a numeric runtime library.

28. The one or more non-transitory computer-readable media of claim 26, wherein the one or more results from the analysis identify model elements that are active in a time window during a dynamic simulation of the model.

29. The one or more non-transitory computer-readable media of claim 26, wherein the instructions further comprise instructions for forming other network units as testing units, the other network units having different sizes from the second network unit and representing different hierarchies of computation from the second hierarchy of computation.

30. The one or more non-transitory computer-readable media of claim 26, wherein the analyzing the relationship is based on one or more rules that are customizable by a user.

31. The one or more non-transitory computer-readable media of claim 26, wherein the generating the one or more network metrics comprises:

analyzing the one or more element metrics, wherein the one or more element metrics are of individual model elements of the second network unit, and where the one or more tests are based on the one or more network metrics.

32. The one or more non-transitory computer-readable media of claim 26, wherein the generating the one or more network metrics comprises:

receiving an input from a user; and applying an algorithm to generate test generation objectives based on the input.

33. The one or more non-transitory computer-readable media of claim 26, further comprising:

displaying the second network unit and at least some of the other model elements of the model on a user interface; and displaying the one or more results of the analysis on the user interface, comprising:

displaying one or more model elements that are related to the one or more results differently from the at least some of the other model elements displayed on the user interface.

34. An apparatus comprising:

a memory storing a model comprising model elements, where at least some of the model elements:

comprise one or more numeric expressions, and represent one or more computations; and one or more processors configured to:

analyze the model to identify a first set of model elements that are associated with a model element, where:

the analyzing comprises analyzing a relationship between one or more computations represented by the first set of model elements and one or more computations represented by the model element, and the first set of model elements and the model element form a first network unit that represents a first hierarchy of computation;

apply one or more results from an analysis of the model to the first network unit to determine a complexity of the first network unit or a coupling of the first network unit to other model elements of the model;

generate a second network unit, representing a second hierarchy of computation, from the first network unit based on the determined complexity of the first network unit or the determined coupling of the first network unit to the other model elements of the model, where the generating comprises modifying the first network unit to form the second network unit by:

adding one or more additional model elements of the model into the first network unit, or removing one or more model elements of the first network unit from the first network unit;

provide the second network unit as a testing unit for testing the model, the second network unit comprising two or more model elements that include at least one model element associated with a masking operation, at least one active element and at least one numeric expression of the one or more numeric expressions;

generating one or more network metrics for testing the second network unit based on one or more rules associated with connectivity of the two or more model elements of the second network unit and one or more element metrics, wherein the one or more network metrics include a criteria for passing an appropriate value according to the at least one model element associated with the masking operation via the at least one active element of the second network unit; and generate one or more tests for the second network unit, wherein the two or more model elements of the second network unit include a first model element implementing a first operation, the first model element and the at least one model element associated with the masking operation arranged in a dependent configuration according to the one or more results from the analysis of the model, wherein the one or more results from the analysis of the model comprise a result of one of (i) a model element type analysis, (ii) a model element connectivity analysis, and (iii) a model element static dependency analysis; and the one or more tests for the second network unit coordinate the first operation implemented by the first model element and the masking operation implemented by the at least one model element associated with the masking operation of the second network unit to prevent masking an effect of the first operation by the masking operation, based on the generated one or more network metrics.

35. The apparatus of claim 34, wherein the second network unit comprises one or more Boolean expressions, one or more control expressions, or one or more saturations, and wherein the one or more numeric expressions comprise variables and expressions that:

correspond to values comprising floating data type in compliance with Institute of Electrical and Electronics Engineers (IEEE) standard 754, fixed point data type, or integer data type, comprise one or more callouts to functions, or comprise a numeric runtime library.

36. The apparatus of claim 34, wherein the one or more results from the analysis identify model elements that are active in a time window during a dynamic simulation of the model.

37. The apparatus of claim 34, wherein the one or more processors is further configured to form other network units as testing units, the other network units having different sizes from the second network unit and representing different hierarchies of computation from the second hierarchy of computation.

38. The apparatus of claim 34, wherein the analyzing the relationship is based on one or more rules that are customizable by a user.

39. The apparatus of claim 34, wherein the generating the one or more network metrics comprises:

analyzing the one or more element metrics, wherein the one or more element metrics are of individual model elements of the second network unit, and where the one or more tests are based on the one or more network metrics.

40. The apparatus of claim 34, wherein the generating the one or more network metrics comprises:

receiving an input from a user; and applying an algorithm to generate test generation objectives based on the input.

41. The apparatus of claim 34, wherein the one or more processors is further configured to:

display the second network unit and at least some of the other model elements of the model on a user interface; and display the one or more results of the analysis on the user interface, comprising:

displaying one or more model elements that are related to the one or more results differently from the at least some of the other model elements displayed on the user interface.

42. One or more non-transitory computer-readable media having stored thereon instructions that when executed by a computing device cause the computing device to perform operations comprising:

in a modeling environment in which models are generated in a modeling language, receiving an indication that a first composite of model elements, supported by the modeling environment, is selected as a candidate for a rule in partitioning a model that comprises the first composite of model elements, where:

at least some of the model elements of the first composite of model elements are connected, two or more of the model elements of the first composite of model elements comprise a model element associated with a masking operation, an active element and numeric expressions, the first composite of model elements is usable as a unit in generating the models or being part of the model in the modeling environment, and the first composite of model elements is in the same modeling language as the models generated in the modeling environment;

analyzing, by one or more processors, the first composite of model elements to determine whether to accept the first composite of model elements as the rule, where:

the analyzing comprises analyzing a relationship among computations represented by the two or more of the model elements of the first composite of model elements;

selectively storing, by the one or more processors, the rule in a rule repository based on the analyzing the first composite of model elements;

selectively providing the rule for use in partitioning the model into testing units for testing the model; and generating one or more network metrics for testing at least one of the testing units based on one or more rules associated with connectivity of model elements of the at least one of the testing units and one or more element metrics, where the one or more network metrics include a criteria for passing an appropriate value according to the model element associated with the masking operation via the active element of the first composite of model elements, wherein a first model element of the first composite of model elements and the model element associated with the masking operation are arranged in a dependent configuration according to one or more results from an analysis of the model, wherein the one or more results from the analysis of the model comprise a result of (i) a model element type analysis, (ii) a model element connectivity analysis, and (iii) a model element static dependency analysis and the testing coordinates computations represented by the first model element and the model element associated with the masking operation to prevent masking an effect of the first model element based on the generated one or more network metrics.

43. The one or more non-transitory computer-readable media of claim 42, wherein the first composite of model elements comprises subsystems, operations, expressions, or variants.

44. The one or more non-transitory computer-readable media of claim 42, wherein the instruction further comprise instruction for identifying a network unit within the model by comparing the model with the first composite of model elements.

\* \* \* \* \*